(12) United States Patent
Hastie

(10) Patent No.: US 7,454,598 B2
(45) Date of Patent: Nov. 18, 2008

(54) CONTROLLING OUT OF ORDER EXECUTION PIPELINES ISSUE TAGGING

(75) Inventor: Neil S. Hastie, Gloucestershire (GB)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/130,555

(22) Filed: May 16, 2005

(65) Prior Publication Data

US 2006/0259741 A1 Nov. 16, 2006

(51) Int. Cl.
*G06C 27/00* (2006.01)
*G06F 3/00* (2006.01)

(52) U.S. Cl. .................. 712/216; 712/217; 712/218; 712/219

(58) Field of Classification Search .............. 711/169; 712/204, 215, 219, 220
See application file for complete search history.

(56) References Cited

U.S. PATENT DOCUMENTS

| | | | | |
|---|---|---|---|---|
| 4,794,518 A | * | 12/1988 | Mizushima | 712/216 |
| 5,941,983 A | * | 8/1999 | Gupta et al. | 712/214 |
| 6,438,681 B1 | * | 8/2002 | Arnold et al. | 712/216 |
| 6,604,192 B1 | * | 8/2003 | Arnold et al. | 712/217 |
| 6,859,873 B2 | * | 2/2005 | Norden et al. | 712/220 |
| 6,889,317 B2 | * | 5/2005 | Sami et al. | 712/218 |
| 6,976,152 B2 | * | 12/2005 | Yeh et al. | 712/217 |
| 2002/0199085 A1 | * | 12/2002 | Norden et al. | 712/219 |
| 2005/0149699 A1 | * | 7/2005 | Norden et al. | 712/219 |
| 2006/0259742 A1 | * | 11/2006 | Norden et al. | 712/219 |

OTHER PUBLICATIONS

Johnson, Superscalar Microprocessor Design, 1991, Prentice Hall, pp. 168-170.*

* cited by examiner

*Primary Examiner*—Matt Kim
*Assistant Examiner*—Cheng-Yuan Tseng
(74) *Attorney, Agent, or Firm*—Dickstein Shapiro LLP

(57) ABSTRACT

A method and system of controlling out of order execution pipelines using issue tags is disclosed. The issue tags are used to dynamically calculate pipeline skew parameters that track the relative position of a load/store instruction in a load/store pipeline and a simultaneously issued integer instruction in a variable length integer pipeline. The issue tags and pipeline skew parameters are used to improve data hazard detection, pipeline stalling, and instruction cancellation.

29 Claims, 17 Drawing Sheets

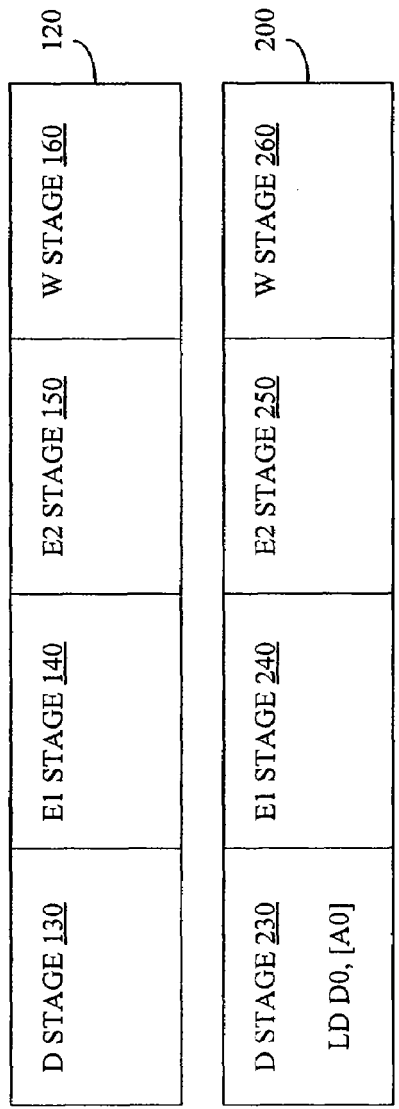
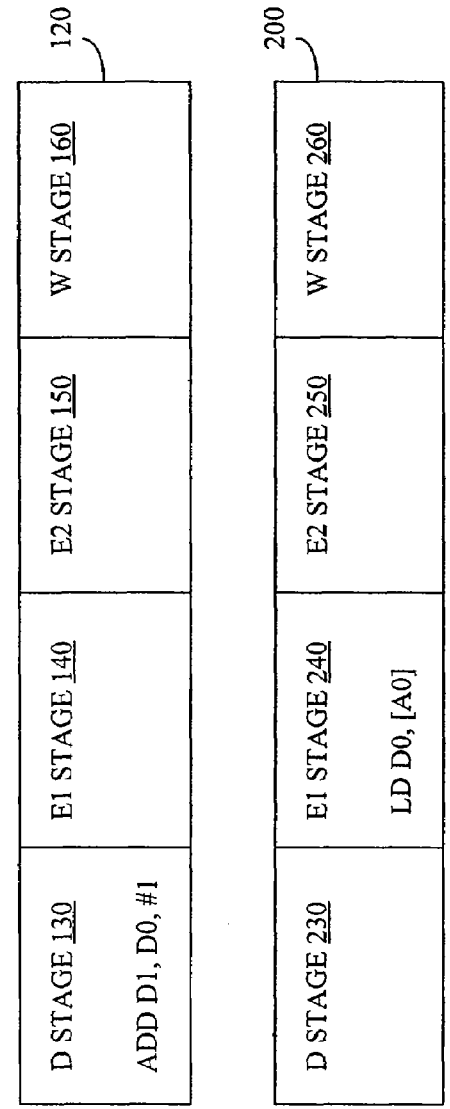
FIGURE 3(a)
FIGURE 3(b)

FIGURE 3(c)

| D STAGE 130 | E1 STAGE 140 | E2 STAGE 150 | W STAGE 160 | — 120 |
|---|---|---|---|---|
| ADD D1, D0, #1 | | | | |

| D STAGE 230 | E1 STAGE 240 | E2 STAGE 250 | W STAGE 260 | — 200 |
|---|---|---|---|---|
| | | LD D0, [A0] | | |

FIGURE 3(d)

| D STAGE 130 | E1 STAGE 140 | E2 STAGE 150 | W STAGE 160 | — 120 |
|---|---|---|---|---|
| ADD D1, D0, #1 | | | | |

| D STAGE 230 | E1 STAGE 240 | E2 STAGE 250 | W STAGE 260 | — 200 |
|---|---|---|---|---|
| | | | LD D0, [A0] | |

| D STAGE 130 | E1 STAGE 140 | E2 STAGE 150 | W STAGE 160 | 120 |
|---|---|---|---|---|
| | ADD D1, D0, #1 | | | |

| D STAGE 230 | E1 STAGE 240 | E2 STAGE 250 | W STAGE 260 | 200 |
|---|---|---|---|---|

FIGURE 3(e)

| D STAGE 130 | E1 STAGE 140 | E2 STAGE 150 | W STAGE 160 | 120 |
|---|---|---|---|---|
| | | ADD D1, D0, #1 | | |

| D STAGE 230 | E1 STAGE 240 | E2 STAGE 250 | W STAGE 260 | 200 |
|---|---|---|---|---|

FIGURE 3(f)

| B1 STAGE 425 | B2 STAGE 427 | D STAGE 130 | E1 STAGE 140 | E2 STAGE 150 | W STAGE 160 |
|---|---|---|---|---|---|
| | ADD D1, D0, #1 | | | | |

400

| D STAGE 230 | E1 STAGE 240 | E2 STAGE 250 | W STAGE 260 |
|---|---|---|---|
| | | LD D0, [A0] | |

| B1 STAGE 425 | B2 STAGE 427 | D STAGE 130 | E1 STAGE 140 | E2 STAGE 150 | W STAGE 160 |
|---|---|---|---|---|---|
| | | ADD D1, D0, #1 | | | |

400

| D STAGE 230 | E1 STAGE 240 | E2 STAGE 250 | W STAGE 260 |
|---|---|---|---|
| | | | LD D0, [A0] |

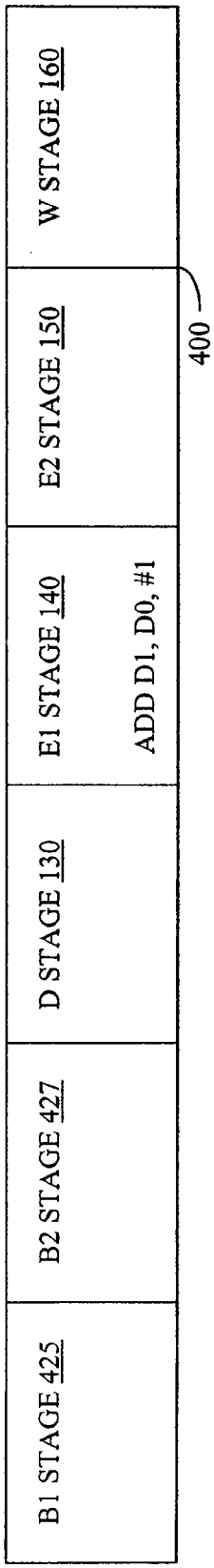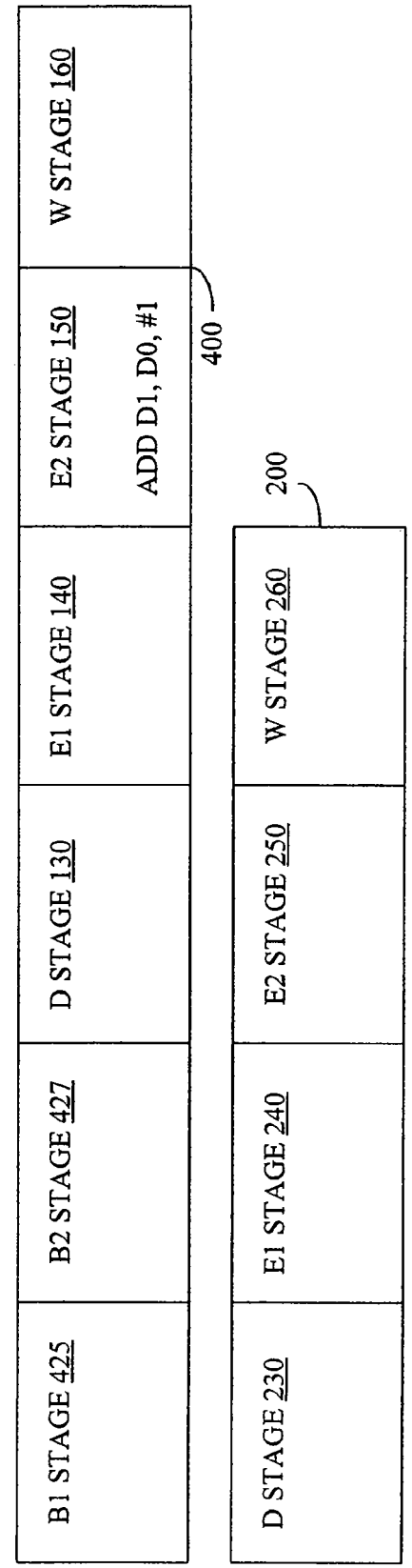
FIGURE 5(e)
FIGURE 5(f)

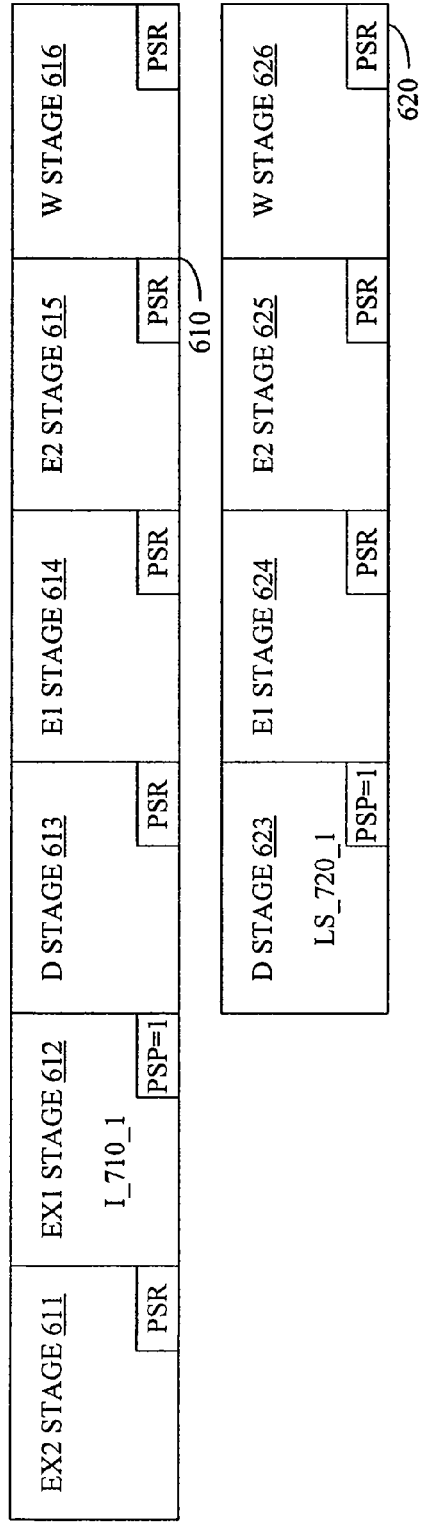
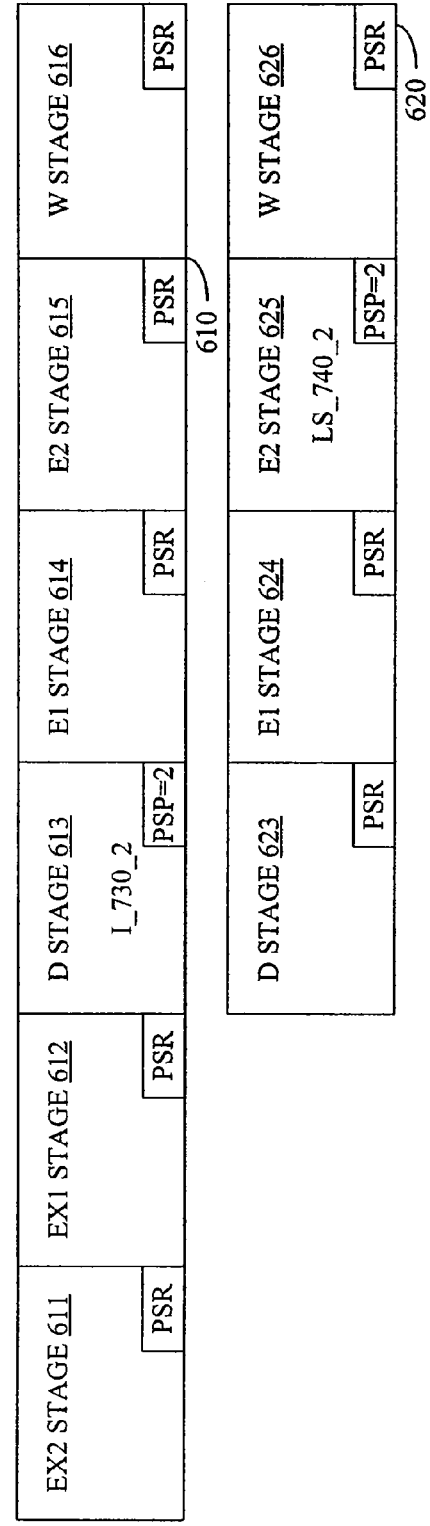
FIGURE 7(a)
FIGURE 7(b)

CONTROLLING OUT OF ORDER EXECUTION PIPELINES ISSUE TAGGING

FIELD OF THE INVENTION

The present invention relates to pipelined processing systems, and more particularly to a method and apparatus for controlling out of order execution pipelines.

BACKGROUND OF THE INVENTION

Modern computer systems utilize a variety of different microprocessor architectures to perform program execution. Each microprocessor architecture is configured to execute programs made up of a number of macro instructions and micro instructions. Many macro instructions are translated or decoded into a sequence of micro instructions before processing. Micro instructions are simple machine instructions that can be executed directly by a microprocessor.

To increase processing power, most microprocessors use multiple pipelines, such as integer pipelines and load/store pipelines to process the macro and micro instructions. Typically, an integer pipeline consists of multiple stages. Each stage in an integer pipeline operates in parallel with the other stages. However, each stage operates on a different macro or micro instruction.

FIG. 1 shows an instruction fetch and issue unit, having an instruction fetch stage (I stage) 105 and a pre-decode stage (PD stage) 110, coupled to a typical four stage integer pipeline 120 for a microprocessor. Integer pipeline 120 comprises a decode stage (D stage) 130, an execute one stage (E1 stage) 140, an execute two stage (E2 stage) 150, and a write back stage (W stage) 160. Instruction fetch stage 105 fetches instructions to be processed. Pre-decode stage 110 groups and issues instructions to one or more pipelines. Ideally, instructions are issued into integer pipeline 120 every clock cycle. Each instruction passes through the pipeline and is processed by each stage as necessary. Thus, during ideal operating conditions integer pipeline 120 is simultaneously processing 4 instructions. However, many conditions as explained below may prevent the ideal operation of integer pipeline 120.

Decode stage 130 decodes the instruction and gathers the source operands needed by the instruction being processed in decode stage 130. Execute one stage 140 and execute two stage 150 performs the function of the instructions. Write back stage 160 writes the appropriate result value into the register file. Pipeline 120 can be enhanced by including forwarding paths between the various stages of integer pipeline 120 as well as forwarding paths between stages of other pipelines. For brevity and clarity forwarding paths, which are well known in the art, are not described in detail herein.

FIG. 2 shows a typical four stage load/store pipeline 200 for a microprocessor coupled to instruction fetch stage 105 and pre-decode stage 110. Load/store pipeline 200 includes a decode stage (D stage) 230, an execute one stage (E1 stage) 240, an execute two stage (E2 stage) 250, and a write back stage (W stage) 260. Load/store pipeline 200 is specifically tailored to perform load and store instructions. By including both a load/store pipeline and an integer pipeline, overall performance of a microprocessor is enhanced because the load/store pipeline and integer pipelines can perform in parallel. Many processors may even include multiple load/store pipelines, multiple integer pipelines, as well as other pipelines to further increase processing power. Decode stage 230 decodes the instruction and reads the register file for the needed information regarding the instruction. Execute one stage 240 calculates memory addresses for the load or store instructions. For store instructions, execute two stage 250 stores the appropriate value into memory. For load instructions, execute two stage 250 retrieves information from the appropriate location. For register load operations, write back stage 260 writes the appropriate value into a register file.

Ideally, integer pipeline 120 and load/store pipeline 200 can execute instructions every clock cycle. However, many situations may occur that causes parts of integer pipeline 120 or load/store pipeline 200 to stall, which degrades the performance of the microprocessor. FIGS. 3(a)-3(f) illustrate a load-use data dependency problem, which causes parts of integer pipeline 120 to stall. Load-use data dependency problems are caused by the issuance of a load instruction followed by an instruction that requires the data being loaded by the load instruction. Specifically, FIGS. 3(a)-3(f) illustrate an instruction "LD D0, [A0]" followed by an instruction "ADD D1, D0, #1". "LD D0, [A0]" causes the value at address A0 to be loaded into data register D0. "ADD D1, D0, #1" adds one to the value in data register D0 and stores the result in data register D1. Thus, the add instruction requires the data (the new value of data register D0) from the load instruction to properly calculate the new value for data register D1. For clarity, FIGS. 3(a)-3(f) omit instruction fetch stage 105 and pre-decode stage 110. To avoid confusion, only two instructions are shown in FIGS. 3(a)-3(f). In actual use other instructions would usually be processed simultaneously in other stages of the pipelines. As shown in FIG. 3(a), instruction "LD D0, [A0]" is first processed in decode stage 230 of load/store pipeline 200. Then, as shown in FIG. 3(b), instruction "LD D0, [A0]" is processed in execute one stage 240 of load/store pipeline 200 and instruction "ADD D1, D0, #1" is processed in decode stage 130 of integer pipeline 120. If instruction "ADD D1, D0, #1" were allowed to propagate through integer pipeline 120, the current value in data register D0 would be used in the add instruction rather than the new value to be loaded from address A0. Thus, decode stage 130, which is configured to detect load-use data dependency problems, holds instruction "ADD D1, D0, #1" in decode stage 130. Because decode stage 130 is full, a pipeline stall at decode stage 130 of integer pipeline 120 occurs. Thus, pre-decode stage 110 could not issue additional instructions into integer pipeline 120.

Then, as shown in FIG. 3(c), instruction "LD D0, [A0]" is processed in execute two stage 250 of load/store pipeline 200. If instruction "ADD D1, D0, #1" were allowed to propagate through integer pipeline 120, the current value in data register D0 would be used in the add instruction rather than the new value to be loaded from address A0. Thus, decode stage 130, which is configured to detect load-use data dependency problems, holds instruction "ADD D1, D0, #1" in decode stage 130. Because decode stage 130 is full, a pipeline stall at decode stage 130 of integer pipeline 120 occurs. Thus, pre-decode stage 110 could not issue additional instructions into integer pipeline 120.

In most microprocessors, timing constraints prohibit forwarding from execute two stage 250. Thus, as shown in FIG. 3(d), instruction "ADD D1, D0, #1" remains in decode stage 130 when instruction "LD D0, [A0]" proceeds to write back stage 260.

After instruction "LD D0, [A0]" is processed in write stage 260 the new value for data register D0 becomes available and integer pipeline can process instruction "ADD D1, D0, #1". Therefore, as shown in FIGS. 3(e), 3(f) and 3(g), after the new data value for data register D0 is available, instruction "ADD D1, D0, #1" is processed through execute one stage 140, execute two stage 150 and write back stage 160.

As explained above stalling a pipeline or parts of a pipeline degrades the overall processing power of a microprocessor. Because load-use data dependency problems are quite common, integer pipelines have been modified to process load-use instructions without stalling. FIG. 4 illustrates an integer pipeline 400 coupled to instruction fetch stage 105 and pre-decode stage 110. Integer pipeline can be used with load/store pipeline 200 to avoid stalling on load-use instructions. Integer pipeline 400, which is similar to integer pipeline 120, includes all the stages of integer pipeline 120 and adds two buffer stages. Specifically, integer pipeline includes a buffer one stage (B1 stage) 425 and a buffer two stage (B2 stage) 427 preceding decode stage 130. Generally, no processing is performed in buffer one stage 425 and buffer two stage 427. However, in some microprocessors some pre-decoding is performed in buffer one stage 425 and buffer two stage 427. For consistency similar parts performing similar functions in different figures are given the same reference numerals. Thus, decode stage 130 is used in both integer pipeline 120 of FIG. 1 and integer pipeline 400 of FIG. 4.

FIGS. 5(a)-(f) illustrate the processing of instruction "LD D0, [A0]" followed by the instruction "ADD D1, D0, #1" using integer pipeline 400 and load/store pipeline 200. As shown in FIG. 5(a), instruction "LD D0, [A0]" is first processed in decode stage 230 of load/store pipeline 200 and instruction. Then, as shown in FIG. 5(b), instruction "LD D0, [A0]" is processed in execute one stage 240 of load/store pipeline 200 and instruction "ADD D1, D0, #1" is stored in buffer one stage 425 of integer pipeline 400. Then, as shown in FIG. 5(c), instruction "LD D0, [A0]" is processed in execute two stage 250 of load/store pipeline 200 and instruction "ADD D1, D0, #1" is stored in buffer 2 stage 427 of integer pipeline 400. As shown in FIG. 5(d), instruction "LD D0, [A0]" is next processed in write back stage 260 and instruction "ADD D1, D0, #1" proceeds to decode stage 130. As explained above, the new value for data register D0 becomes available when instruction "LD D0, [A0]" is processed by write back stage 260. Thus as shown in FIG. 5(e), instruction "ADD D1, D0, #1" can proceed to execute 1 stage 140 without stalling integer pipeline 400. As shown in FIGS. 5(f) and 5(g), instruction "ADD D1, D0, #1" is processed through execute two stage 150 and write back stage 160.

Thus, including buffer one stage 425 and buffer two stage 427 allows integer pipeline 400 to avoid stalling on load-use data dependency problems. However, using buffer one stage 425 and buffer two stage 427 increases the latency of integer pipeline 400 because an instruction must pass through six stages of integer pipeline 400 rather than the four stages of integer pipeline 120. Furthermore, longer integer pipelines suffer delays on several other types of pipeline stalls. For example, speculative execution caused by conditional branching instruction may cause pipeline stalls. A typical conditional branch instruction has the form: If {branch condition is satisfied} then jump to the instruction at the {branch address}. For example the macro instruction "JZ 100" can be interpreted as: if {the operand of the preceding instruction was zero} then jump to the instruction at {address 100}. To avoid pipeline stalls, most processors selects an outcome for the conditional branch instruction and processes instructions as if the selected outcome is correct. Actual determination of the conditional branch condition does not occur until execute one stage 140 or execute two stage 150. Thus, in longer pipelines, determination of the result of the conditional branch instruction is delayed as compared to shorter pipelines. Specifically, each buffer stage delays determination of the conditional branch instruction by one clock cycle. Thus, the performance of integer pipeline 400 on conditional branch instruction is worse than the performance of integer pipeline 120. In addition, a mixed register instruction which uses the data register file of the integer pipeline and the execution stages of the load/store pipeline would cause stalls due to the delays caused by the buffer one stage and the buffer two stage. Especially, if the mixed register instruction has a data register as a destination and a following integer instruction is using this value, then the integer instruction needs to stall. Thus, the conventional solution to avoid load-use data dependency problems, degrades performance for other instruction types and may reduce the overall processing speed of the microprocessor. Hence there is a need for an integer pipeline that can avoid load-use data dependency problems while minimizing problems associated with long integer pipelines.

SUMMARY

Accordingly, a variable length instruction pipeline in accordance with on embodiment of the present invention includes expansion stages which can be inserted into an instruction pipeline to avoid load-use data dependency problems and removed from the instruction pipeline when not needed to minimize problems associated with long instruction pipelines. A pipeline skew parameter is included in each stage of the integer pipeline and the load store pipeline to track how far ahead or how far behind an instruction is compared to other instructions that were issued simultaneously.

For example, in one embodiment of the present invention, a processor has at least one integer pipeline having multiple integer pipeline stages and at least one load store pipeline having multiple load/store pipeline stages. A first integer instruction and a first load/store instruction are simultaneously issued to a first integer pipeline stage and a first load/store pipeline stage, respectively. A first integer skew parameter and a first load/store skew parameter are generated and stored in the first integer pipeline stage and the first load/store pipeline stage, respectively.

The first integer skew parameter propagates through the integer pipeline with the first integer instruction. Similarly, the first load/store skew parameter propagates through the load/store pipeline with the first load/store instruction. The first integer skew parameter is incremented when the first load/store instruction propagates down the load/store pipeline and the first integer instruction is stalled in the integer instruction. Conversely, the first integer skew parameter is decremented when the first integer instruction propagates down the integer pipeline and the first load/store instruction is stalled in the load/store pipeline. The pipeline skew parameters are used to improve data hazard detection, pipeline stalling, and instruction cancellation.

In another embodiments of the present invention, issue tags are used to generate the propagation skew parameters. Specifically, when the first integer instruction and the first load/store instruction are simultaneously issued, a first integer issue tag and a first load/store issue tag are generated and stored with the first integer instruction and first load/store instruction, respectively. In general the newly generated integer issue tag and load/store issue tag are identical. However the newly generated integer issue tag is unique relative to other integer issue tags in the integer pipeline. The first integer issue tag propagates through the integer pipeline with the first integer instruction. Similarly, the first load/store issue tag propagates through the load/store pipeline with the first load/store instruction. The issue tags are used to generate pipeline skew parameters, which can be used to improve data hazard detection, pipeline stalling, and instruction cancellation.

The present invention will be more fully understood in view of the following description and drawings.

BRIEF DESCRIPTION OF THE DRAWINGS

FIGS. 3(a)-3(g) illustrate the performance of an integer pipeline and a load/store pipeline.

FIG. 4 FIG. 1 is simplified diagram of a conventional integer pipeline.

FIGS. 5(a)-5(g) illustrate the performance of an integer pipeline and a load/store pipeline.

FIGS. 7(a)-7(b) illustrate the performance of an integer pipeline and a load/store pipeline in accordance with one embodiment of the present invention.

DETAILED DESCRIPTION

Figure 1:
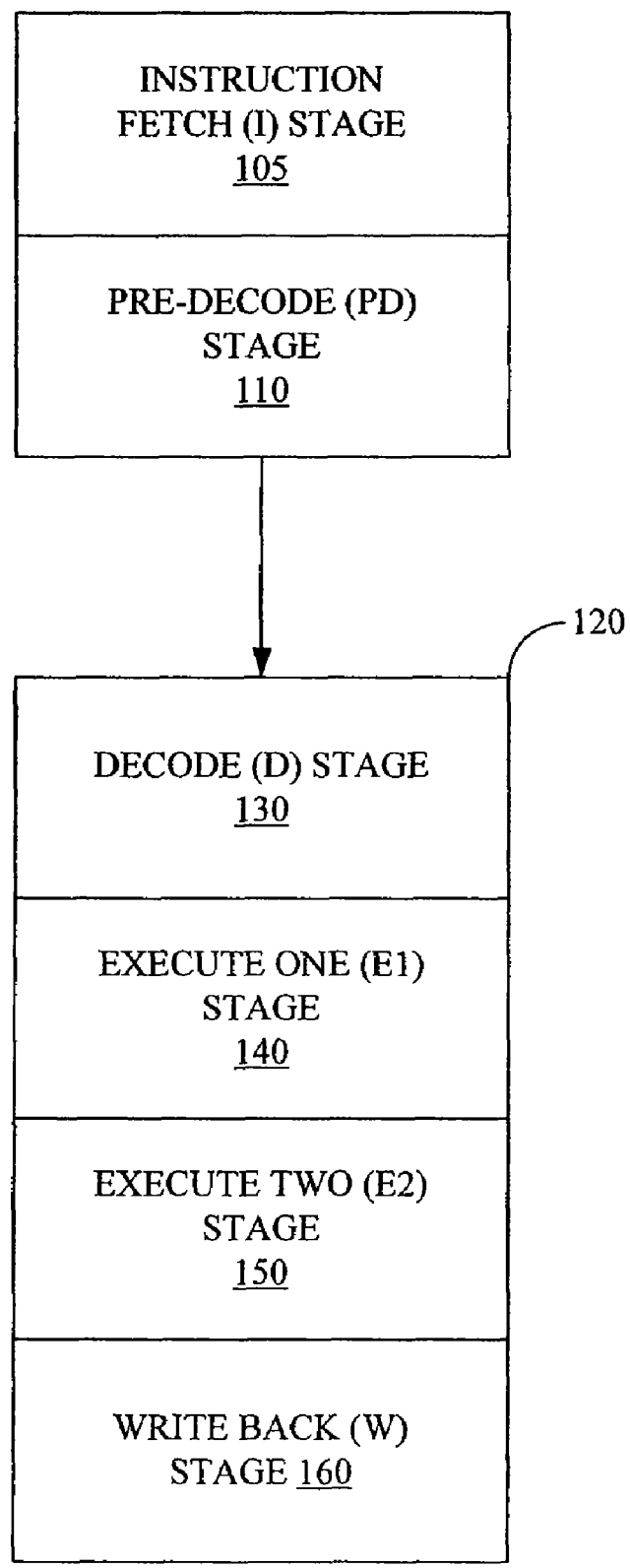
FIG. 1 is simplified diagram of a conventional integer pipeline.
Figure 2:
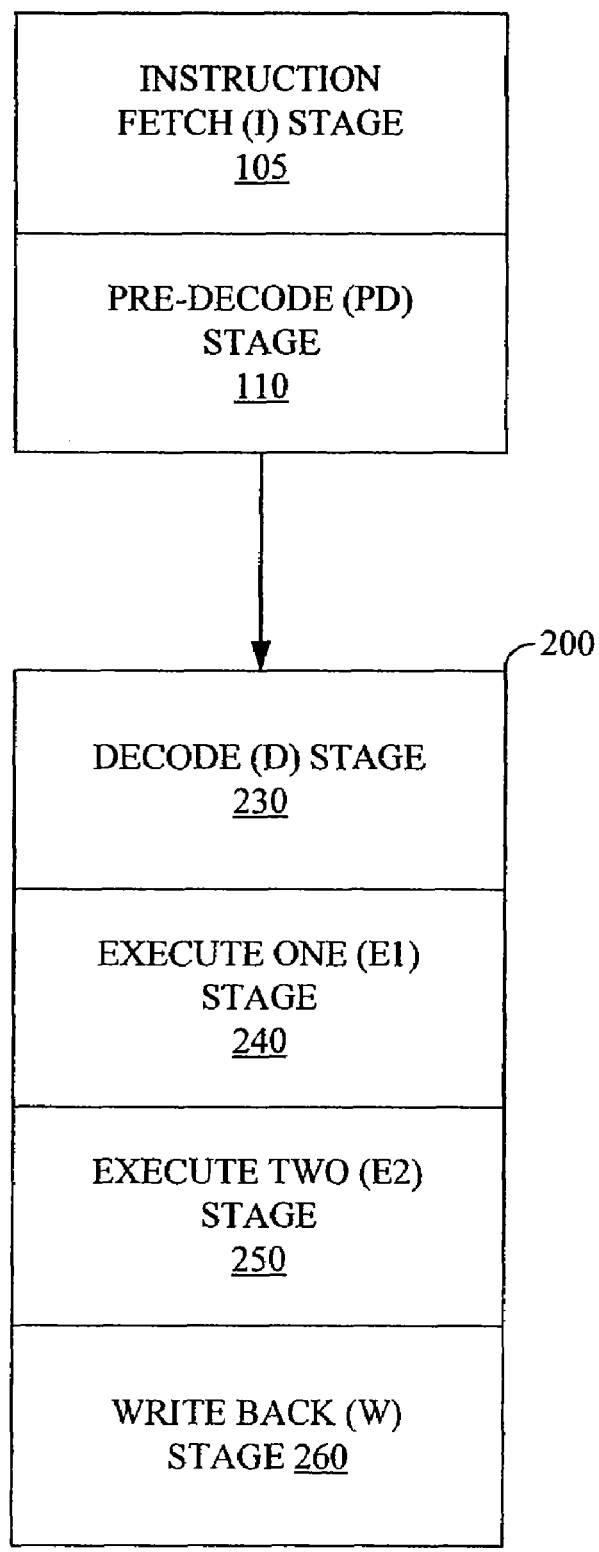
FIG. 2 is simplified diagram of a conventional load/store pipeline.
Figure 3G:
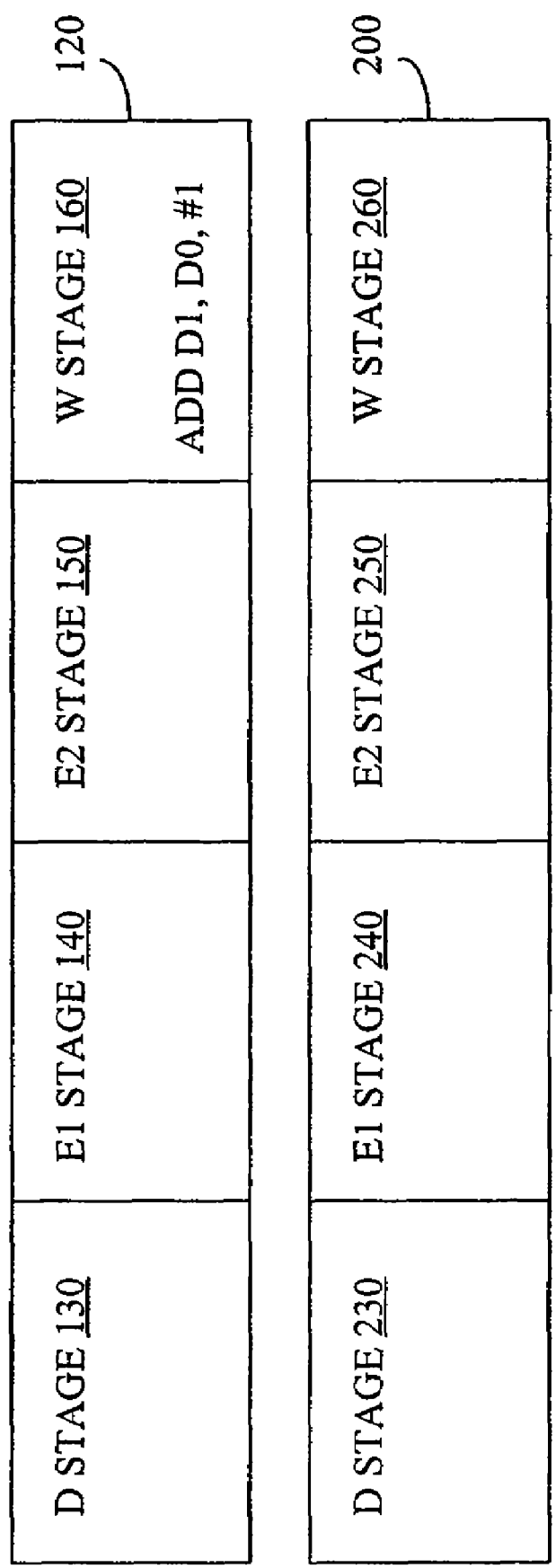
Figure 4:
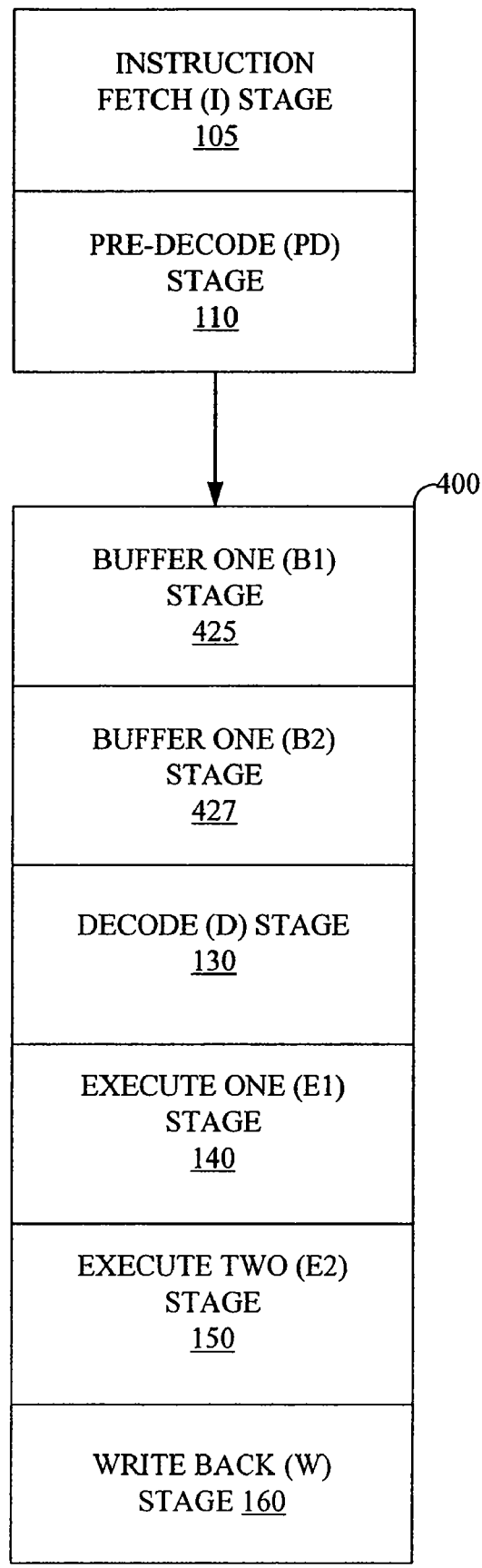
Figure 5A:
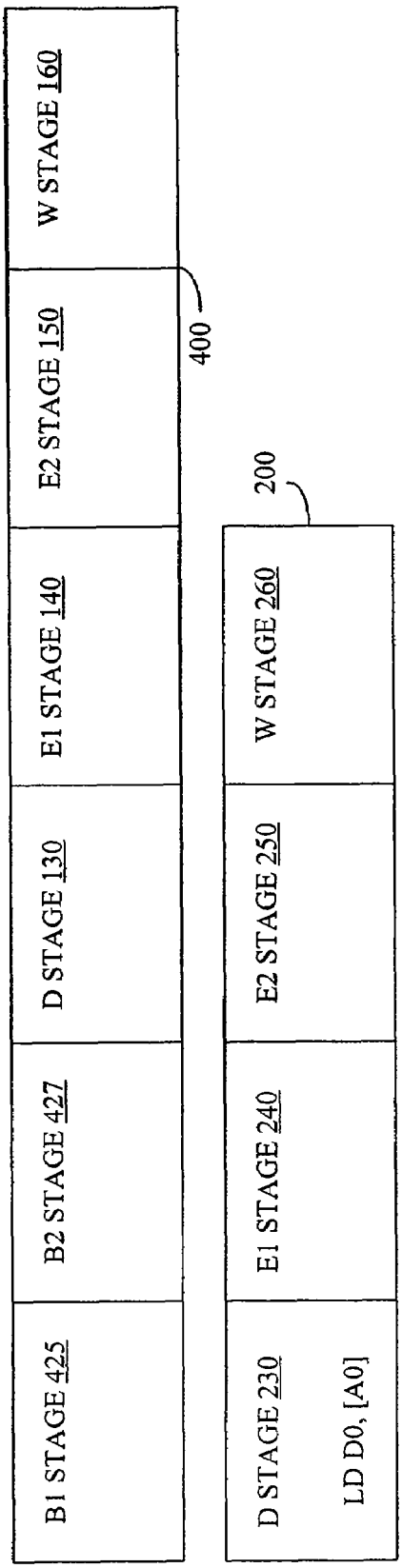
Figure 5B:
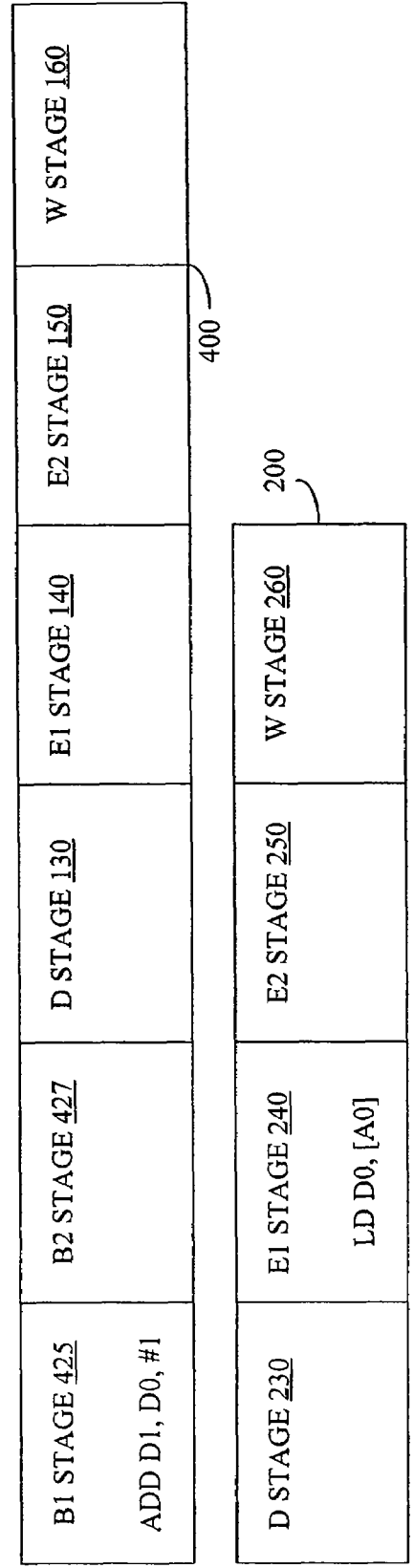
Figure 5G:
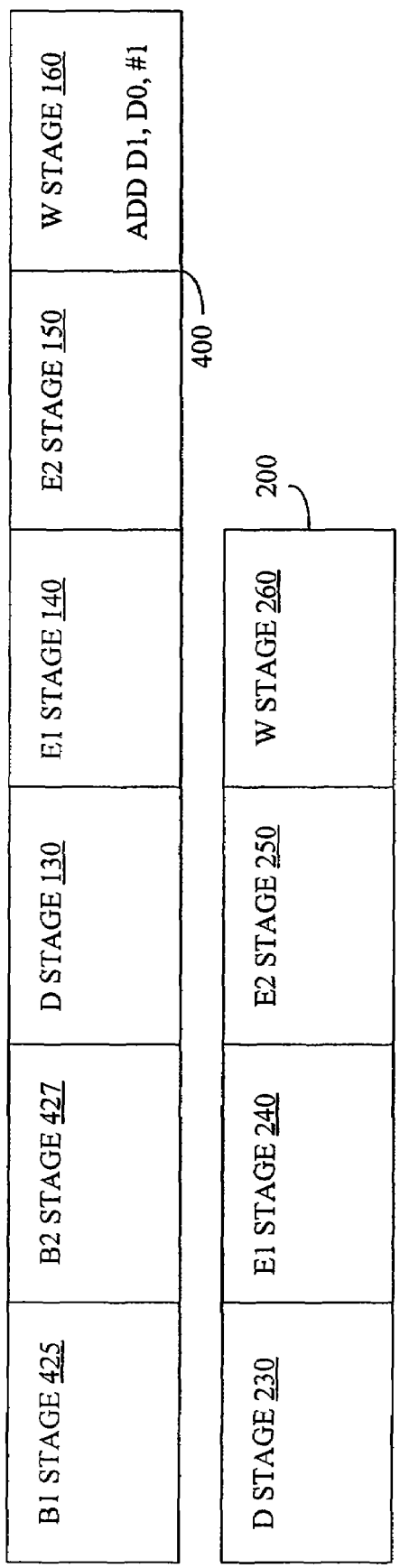
Figure 6A:
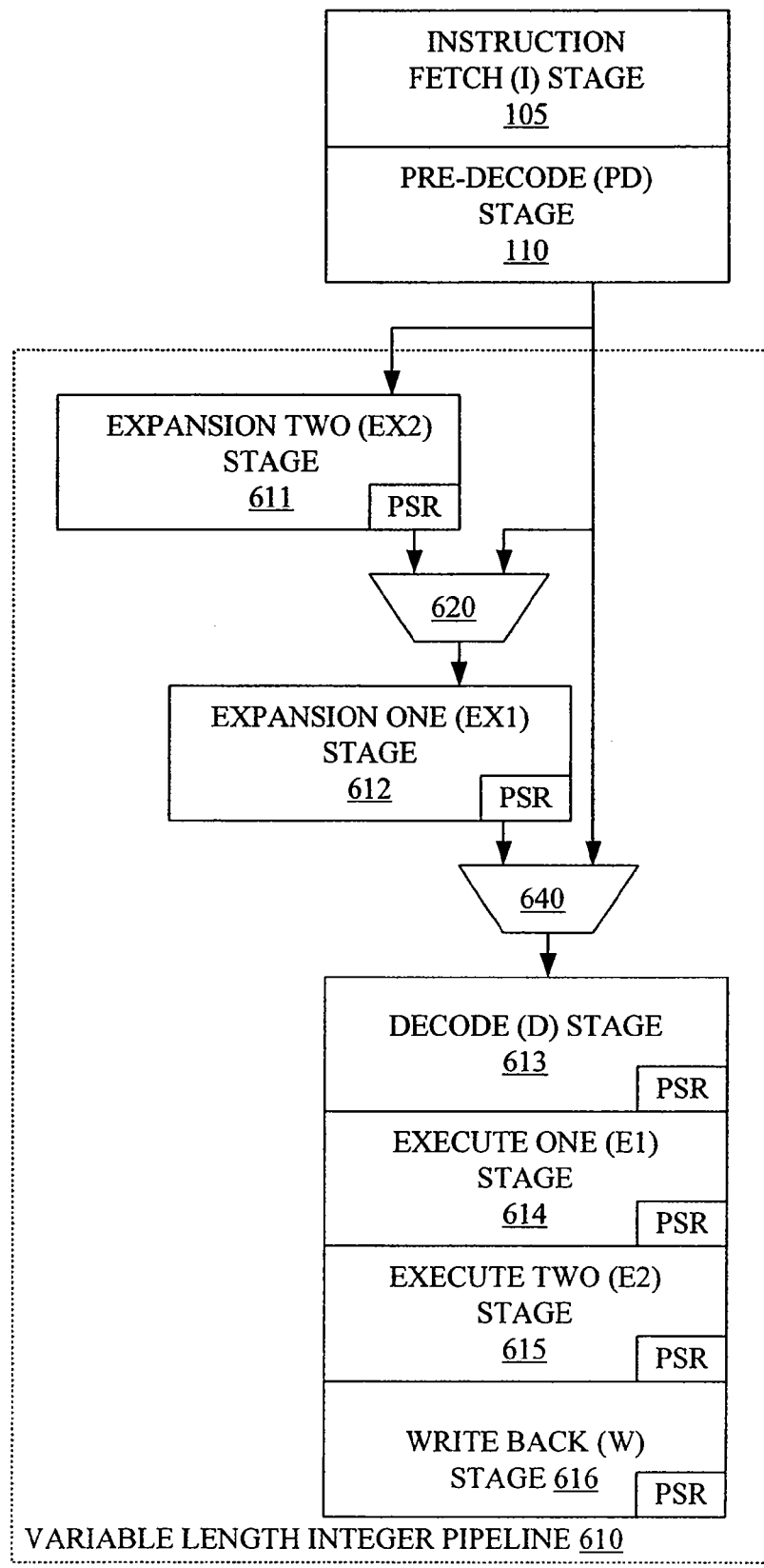
FIG. 6(a) is a block diagram of a variable length integer pipeline in accordance with one embodiment of the present invention.

FIG. 6(a) is a block diagram of a variable length integer pipeline 610 in accordance with one embodiment of the present invention. Variable length integer pipeline 610 is coupled to instruction fetch stage 105, pre-decode stage 110 and includes decode stage 613, execute one stage 614, execute two stage 615, write back stage 616, an expansion one stage (EX1 stage) 611, an expansion two stage (EX2 stage) 612, a multiplexer 620, and an multiplexer 640. Variable length integer pipeline 610 can function as a four-stage pipeline, a five-stage pipeline or a six-stage pipeline. Other embodiments of the present invention may include more expansion stages to allow even greater flexibility. Furthermore, some embodiments of the present invention may use only a single expansion stage. For clarity, the examples described herein use a variable length integer pipeline, however the principles of the present invention can be adapted for use with any type of instruction pipelines.

Figure 6B:
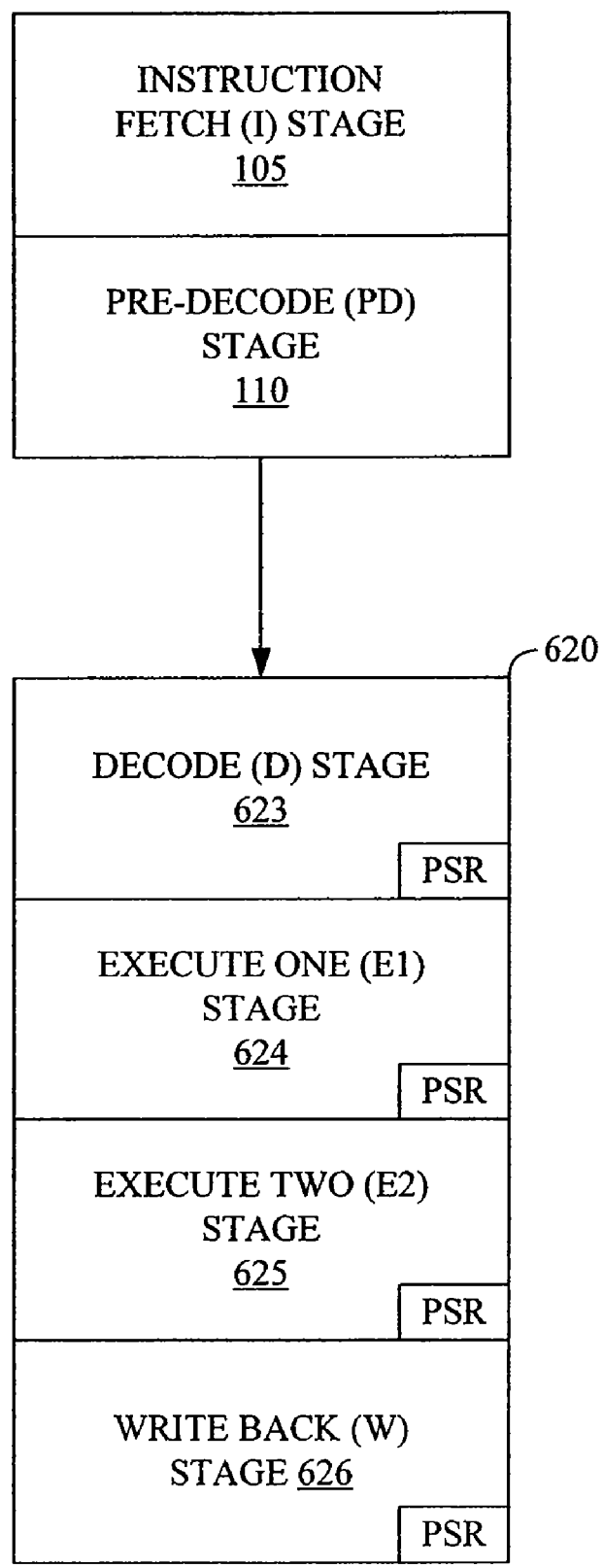
FIG. 6(b) is a block diagram of a load/store pipeline in accordance with one embodiment of the present invention.

Due to the variable length of the integer pipeline, a pipeline skew parameter for each instruction is used to track the skew between the integer pipeline and the load store pipeline. Specifically, the pipeline skew parameter is used to track the relative position of a load/store instruction and an integer instruction that were simultaneously issued to the load/store pipeline and the variable length integer pipeline, respectively. Each stage of variable length integer pipeline 610 as well as a load store pipeline 620 (as illustrated in FIG. 6(b) includes a pipeline skew register PSR, which stores the pipeline skew parameter of the instruction in the pipeline stage. Generation, modification and use of pipeline skew parameters are described in detail below. For clarity, in the embodiments described herein, an integer instruction that is simultaneously issued with load store instruction precedes the load/store instruction in the instruction sequence of the program. However, the principles of the present invention can be easily adapted by one skilled in the art to processors that simultaneously issue load/store instructions with an integer instruction that follows the load/store instruction.

In the four stage configuration of variable length integer pipeline 610, instructions from pre-decode stage 110 pass through decode stage 613, execute one stage 614, execute two stage 615, and write back stage 616. Instructions are passed from pre-decode stage 110 to decode stage 613 through multiplexer 640. In the five stage configuration, expansion one stage 612 is inserted in between pre-decode stage 110 and decode stage 613. Specifically, multiplexer 620 is configured to pass instructions from pre-decode stage 110 to expansion one stage 612, while multiplexer 640 is configured to pass instructions from expansion one stage 612 to decode stage 613. In the six stage configuration, expansion two stage 611 is inserted in between pre-decode stage 110 and expansion one stage 612. Specifically, Expansion two stage 611 receives instructions from pre-decode stage 110. Multiplexer 620 is configured to pass instructions from expansion two stage 611 to expansion one stage 612, and multiplexer 640 is configured to pass instructions from expansion one stage 612 to decode stage 613.

To reduce latency and to avoid problems associated with long pipelines, variable length integer pipeline 610 attempts to operate as a four-stage integer pipeline when possible. However, when a pipeline stall in decode stage 613 occurs, variable length integer pipeline 610 expands to continue accepting instructions. For example, if a load-use data dependency problem occurs, which would cause an instruction to remain in decode stage 613, variable length integer pipeline 610 would expand to include expansion one stage 612 if pre-decode stage 110 issue another instruction. Specifically, pre-decode stage 110 would be able to issue the new instruction into expansion one stage 612. Similarly, variable length integer pipeline 610 can accept an additional instruction by expanding to include expansion two stage 611 so that the instruction in pre-decode stage 110 can be issued into expansion two stage 611. In embodiments of the present invention having additional expansion stages, a variable length integer pipeline can expand to include the additional expansion stages so that pre-decode stage 110 can issue additional instructions into variable length integer pipeline 610.

When variable length integer pipeline 610 is in an expanded mode, i.e. operating with expansion stages, variable length integer pipeline 610 can contract when an instruction is processed through decode stage 613 of variable length integer pipeline 610 and no new instruction is issued to variable integer pipeline 610. Thus, in general, variable length integer pipeline 610 contracts when variable length integer pipeline is not stalled and no integer instruction is issued to variable length integer pipeline 610.

FIG. 6(b) shows a four-stage load/store pipeline 620 for a microprocessor coupled to instruction fetch stage 105 and pre-decode stage 110. Load/store pipeline 620 includes a decode stage (D stage) 623, an execute one stage (E1 stage) 624, an execute two stage (E2 stage) 625, and a write back stage (W stage) 626. As stated above each stage of load/store pipeline 620 includes a pipeline skew register PSR, which is used to store the pipeline skew parameter of the instruction in the pipe stage. Decode stage 623 decodes the instruction and reads the register file for the needed information regarding the instruction. Execute one stage 624 calculates memory addresses for the load or store instructions. For store instructions, execute two stage 625 stores the appropriate value into memory. For load instructions, execute two stage 625 retrieves information from the appropriate value into a register file. For register load operations, write back 626 writes the appropriate value into a register file.

As explained above, the pipeline skew parameter is used to track the relative position of a load/store instruction and an integer instruction that were simultaneously issued to the load/store pipeline and the variable length integer pipeline, respectively. Specifically, the pipeline skew parameter is defined so that decode stage 613, execute one stage 614, execute two stage 615, write back stage 616 of variable length integer pipeline 610 corresponds to decode stage 623, execute one stage 624, execute two stage 625, write back stage 626 of load/store pipeline 620. Thus, for example, when an integer instruction is in decode stage 613 and a simultaneously issued load/store instruction is in decode stage 623 the pipeline skew parameters of both instructions are zero. Similarly, when an integer instruction is in execute one stage 614 and a simultaneously issued load/store instruction is in execute one stage 624 the pipeline skew parameters of both instructions are zero.

However as illustrated in FIG. 7(*a*), when an integer instruction I_710_1 is in expansion one stage 612 of variable length integer pipeline 610 and a simultaneously issued load/store instruction LS_720_1 is in decode stage 623 of load/store pipeline 620, the pipeline skew parameter of integer instruction I_710_1 is equal to 1 and the pipeline skew parameter of load/store instruction LS_720_1 is equal to 1. For clarity, instructions described herein may be referenced as INSTRUCTIONTYPE_NUMBER_ISSUEGROUP, where INSTRUCTIONTYPE refers to the type of instruction (e.g. I for integer, LS for load/store), NUMBER is a unique number to distinguish different instructions, and ISSUEGROUP is a group number that is assigned to each issue group. An issue group includes one or more instructions that were issued in the same cycle. Thus, integer instruction I_710_1 and load/store instruction LS_720_1 were simultaneously issued as issue group number 1. As illustrated in FIG. 7(*b*), when an integer instruction I_730_2 is in decode stage 613 of variable length integer pipeline 610 and a simultaneously issued load/store instruction LS_740_2 is in execute two stage 625, the pipeline skew parameters of both instructions is equal to 2. Thus, in general the pipeline skew parameter is equal to the number of pipeline stages that simultaneously issued instructions are offset in variable length integer pipeline 610 and load/store pipeline 620. For clarity, the examples described herein are for a variable length integer pipeline and a load/store pipeline; however, the principles taught herein can be adapted by one skilled in the art for use in processors having different types of pipelines and for use in processors having multiple load/store pipelines and multiple integer pipelines.

Figure 8A:
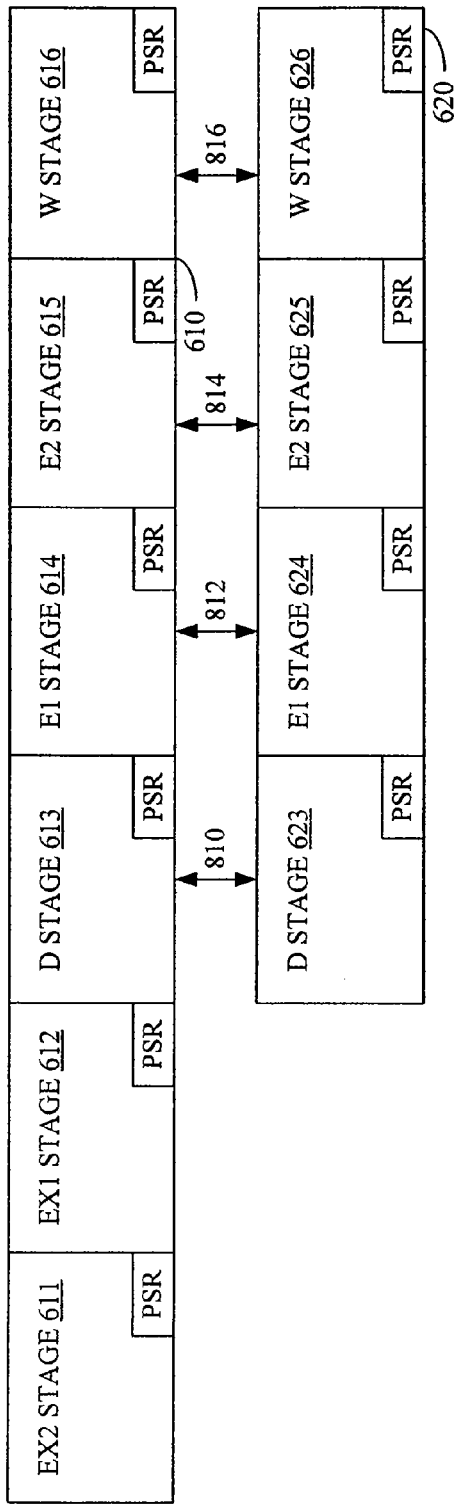
FIGS. 8(a)-8(c) illustrates the correspondence between stages of a load store pipeline and a variable length integer pipeline for various skew values in accordance with one embodiment of the present invention.
Figure 8B:
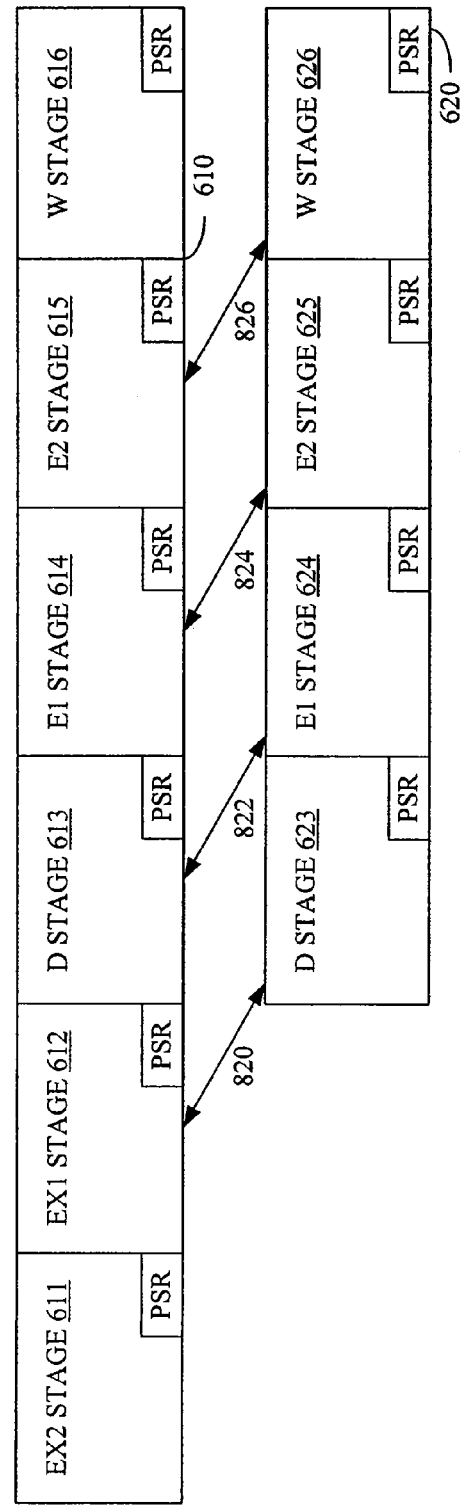
Figure 8C:
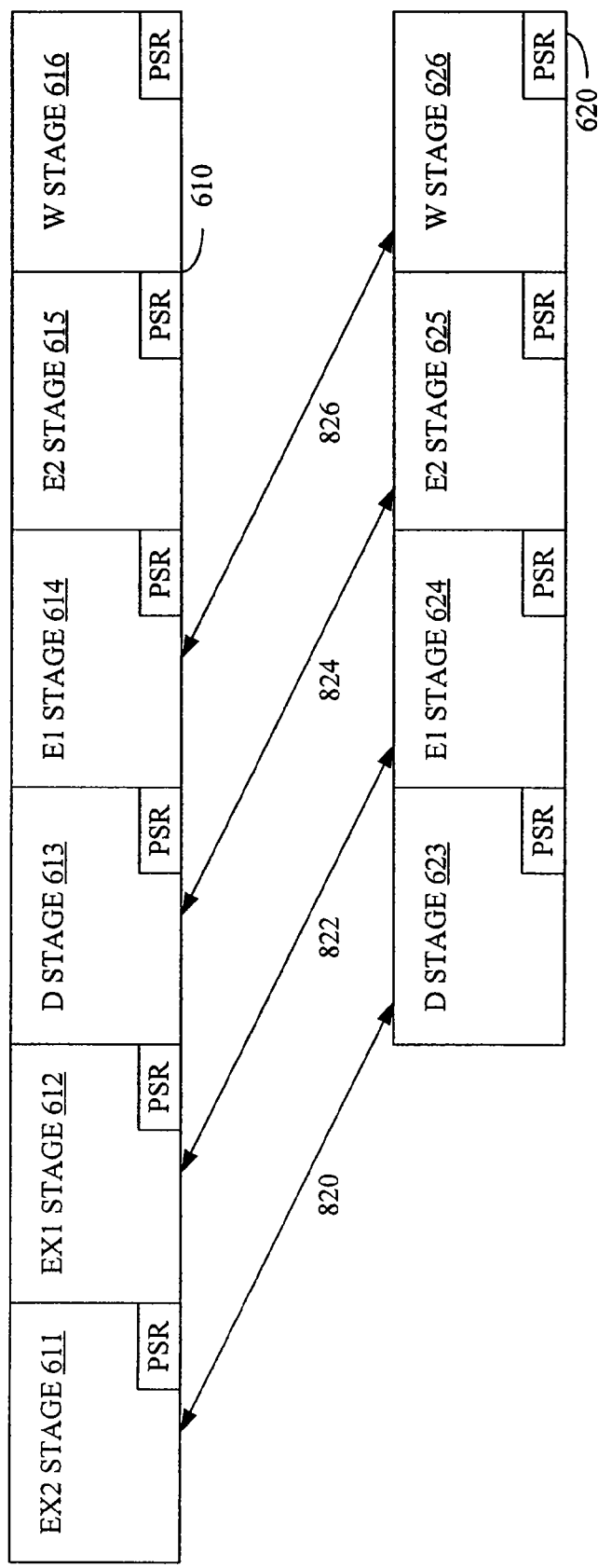

FIGS. 8(*a*)-8(*c*) illustrate the skew relationship between different stages for an embodiment of the present invention. FIG. 8(*a*) illustrates the correspondence between stages of load store pipeline 620 and variable length integer pipeline 610 when the pipeline skew is equal to zero. As used herein a stage of the load store pipeline corresponds with a stage of the integer pipeline when the two stages contain simultaneously issued instructions. As indicated by arrow 810, decode stage 613 of variable integer pipeline 610 corresponds with decode stage 623 of load store pipeline 620 when the pipeline skew is equal to zero. Similarly, arrows 812, 814, and 816 indicates that execute one stage 614, execute 2 stage 615, and write back stage 616 of variable length integer pipeline 610 corresponds with execute one stage 624, execute 2 stage 625, and write back stage 626 of load/store pipeline 620, respectively, when the pipeline skew is equal to zero.

FIG. 8(*b*) illustrates the correspondence between stages of load store pipeline 620 and variable length integer pipeline 510 when the pipeline skew is equal to one. As indicated by arrow 820, expansion one stage 612 of variable integer pipeline 610 corresponds with decode stage 623 of load/store pipeline 620 when the pipeline skew is equal to one. Similarly, arrows 822, 824, and 826 indicates that decode stage 613, execute one stage 614, and execute 2 stage 625, and write back stage 626 of load/store pipeline 620, respectively, when the pipeline skew is equal to one.

FIG. 8(*c*) illustrates the correspondence between stages of load store pipeline 620 and variable length integer pipeline 510 when the pipeline skew is equal to two. As indicated by arrow 820, expansion two stage 611 of variable integer pipeline 610 corresponds with decode stage 623 of load store pipeline 620 when the pipeline skew is equal to two. Similarly, arrows 822, 824, and 826 indicates that expansion one stage 612, decode stage 614, and execute one stage 614 of variable length integer pipeline 610 corresponds with execute one stage 624, execute 2 stage 625, and write back stage 626 of load/store pipeline 620, respectively, when the pipeline skew is equal to two. Thus, the pipeline skew parameter can be used to easily identify corresponding stages in different pipelines.

Pipe skew parameters are generated during instruction issuing. Specifically, when an integer instruction is issued to decode stage 613 simultaneously with a load/store instruction (which is always issued to decode stage 623), the pipe skew parameters of both instructions is equal to 0. When an integer instruction is issued to expansion one stage 612 simultaneously with a load/store instruction, the pipe skew parameter of both instructions is equal to 1. When an integer instruction is issued to expansion two stage 611 simultaneously with a load/store instruction, the pipe skew parameter of both instructions is equal to 2. In one embodiment of the present invention, when an integer instruction is single issued (i.e. no load/store instruction is simultaneously issued), a bubble is issued into the load/store pipeline. The bubble is maintained in the load/store pipeline and behaves as a NOP (No operation) instruction. Pipeline skew parameters can be assigned as if the bubble were simultaneously issued load/store instruction. For single issued load/store instruction, the pipeline skew parameter is equal to the greater of zero or the pipeline skew parameter stored in the pipeline skew register of execute one stage 624 minus 1.

The pipeline skew parameters are propagated through the pipeline stages and stored in the pipeline skew registers of each pipeline stage. As the skew between instructions changes the appropriate pipeline skew parameters are modified (as described below). The pipeline skew parameters are used for hazard detections and data forwarding, to facilitate pipeline stalling, and instruction cancellations.

First, the pipeline skew parameters are used to detect data hazards such as read after write (RAW) hazards and write after write (WAW) hazards, and to use data forwarding to resolve the hazards. If data forwarding is not possible, the pipeline needs to be stalled as described below. Instructions typically read source operands from the register file. However, due to pipelining the proper data may not yet be in the register file because data resulting from preceding instructions have not been written into the register file. To detect these read after write (RAW) hazards the source register addresses of the instruction in the decode stage of a pipeline are compared to all destination register addresses of all preceding instructions in later pipeline stages. If a destination register address of a preceding instruction matches the source register address of the instruction in a decode stage, then a RAW hazard is detected. This search mechanism start with the closest preceding instruction and ripples up to the oldest instruction available in the pipelines. The search stops when a match is found or the oldest instruction in the pipeline is reached. This is a linear search through the pipeline for pure in-order execution but for limited out-of-order execution the search order not only depends on the pipeline stage but also on the individual pipeline skew parameters.

Table 1 lists the pipeline stages from highest priority to lowest priority with regards to the address search for hazards. The specific priority of each load/store pipeline stage depends on the pipeline skew parameter in the pipeline stage. Thus, for example, Execute one stage 624 of load/store pipeline 620 appears in table 1 once for each value of the pipeline skew parameter of execute one stage 624. However, in an actual search each load/store pipeline stage appears once in a priority table, but the specific location of each pipeline stage shifts due to the pipeline skew parameters.

TABLE 1

| PIPELINE | Pipeline Stage | PSP |
|---|---|---|
| Integer | Expansion two stage 611 | any |
| Load/Store | Execute one stage 624 | 2 |
| Integer | Expansion one stage 612 | any |
| Load/Store | Execute one stage 624 | 1 |
| Load/Store | Execute two stage 625 | 2 |
| Integer | Decode Stage 613 | any |
| Load/Store | Execute one stage 624 | 0 |
| Load/Store | Execute two stage 625 | 1 |
| Load/Store | Write Back Stage 626 | 2 |
| Integer | Execute One Stage 614 | any |
| Load/Store | Execute two stage 625 | 0 |
| Load/Store | Write Back Stage 626 | 1 |
| Integer | Execute two Stage 615 | any |
| Load/Store | Write Back Stage 626 | 0 |
| Integer | Write Back Stage 616 | any |

In some embodiments of the present invention, the pipeline skew is limited to two pipeline stages. Thus, the maximum pipeline skew parameter is equal to two. For these embodiments, specific pipeline stages would only need to use a portion of the priority table (i.e. Table 1) depending on the pipeline skew parameter of the particular pipeline stage. Specifically, if a read instruction is in decode stage 623 of load/store pipeline 620 the entire priority table is used when the pipeline skew parameter of decode stage 623 is equal to two. However, when the pipeline skew parameter of decode stage 623 is equal to 1 the search can start from the table entry for expansion one stage 612 of variable length integer pipeline 610 Furthermore, when the pipeline skew parameter of decode stage 623 is equal to 0 the search can start from the entry for decode stage 613 of variable length integer pipeline.

When a read instruction is in execute one stage 625 of load/store pipeline 620, the search can begin at the entry for expansion one stage 612, decode stage 613, ore execute one stage 614, when the pipeline skew parameters of execute two stage 625 is equal to 2, 1, and 0, respectively. When a read instruction is in execute two stage 625 of load/store pipeline 620, the search can begin at the entry for decode stage 613, execute one stage 614, or execute stage 615, when the pipeline skew parameters of execute two stage 625 is equal to 2, 1, and 0, respectively. When a read instruction is in-write back stage 626 of load/store pipeline 620, the search can begin at the entry for execute one stage 614, execute stage 615, or write back stage 61, when the pipeline skew parameters of write back stage 626 is equal to 2, 1, and 0, respectively. Thus, in general for a load/store instruction, the search for RAW hazards in the integer pipeline includes the corresponding integer pipeline stage and later stages of the integer pipeline.

Furthermore, the search for RAW hazards would also include later load/store pipeline stages.

When a read instruction is in decode stage 613 of variable length integer pipeline 610, then the search can start just after the entry for decode stage 613 of variable length integer pipeline 610 when the pipeline skew parameter of decode stage 613 is equal to 0 or 1. However, if the pipeline skew parameter of decode stage 613 is equal to 2, the search can start at the entry for write back stage 626 when the pipeline skew parameter of write back stage 626 is equal to 2 or at the entry for execute one stage 614 when the pipeline skew parameter of write back stage 626 is not equal to 2.

Sometimes an instruction cannot proceed within the pipeline, e.g. due to data dependencies like RAW hazards, or resource contention. Consequently, the instruction stalls. Furthermore, younger instructions (i.e. instructions that follow the stalled instruction within the instruction sequence of the program) within the same pipeline also stall because the first stalled instruction remains in the pipeline stage so other instructions are prevented from entering that pipeline stage. For example, if an instruction in the execute 1 stage must stall, then the execute 1 stage is already occupied and no instruction from the decode stage of the same pipeline can proceed to the execute 1 stage until the instruction in the execute 1 stage can proceed. Due to stalling younger instructions, all instructions are executed in-order. However, for processors having multiple execution pipelines, parallel resources (pipelines) are available so that instructions can be issued out-of-order. Embedded processors, even those with parallel pipelines, mostly avoid out-of-order execution due to the high cost in chip area and development. On the other hand, high-end processors use out-of-order execution. The present invention uses a new technique of limited out-of-order execution to achieve better performance without excessive cost.

Due to variable length integer pipeline 610, pipeline stalls are separated into two classes: precise stalls and imprecise stalls. For a precise stall of an instruction, all younger instructions in all parallel pipelines are also stalled. Conversely, for an imprecise stall of an instruction, younger instructions e.g. in a parallel pipeline can continue.

The pipeline skew parameter provides an easy mechanism to determine which pipeline stages need to be stalled when a pipeline stall does occur. When a precise stall occurs in decode stage 613 of variable length integer pipeline 610, expansion two stage 611 and expansion one stage 612 are also stalled. As explained above and illustrated in FIG. 8(c), when the pipeline skew parameter of decode stage 613 is equal to 2, decode stage 613 corresponds with execute two stage 625. Therefore, the instructions in decode stage 623, execute one stage 624, and execute two stage 625 of load/store pipeline 620 are all younger than the instruction in decode stage 613 of variable length integer pipeline 610. Therefore, the instructions in decode stage 623, execute one stage 624, and execute two stage 625 of load/store pipeline 620 are also stalled when a precise stall occurs in decode stage 613 and the pipeline skew parameter of decode stage 613 is equal to 2. Similarly, when a precise stall occurs in decode stage 613 and the pipeline skew parameter of decode stage 613 is equal to 1, which indicates decode stage 613 corresponds with execute one stage 624, decode stage 623 and execute one stage 624 of load/store pipeline 620 are also stalled. Likewise, when a precise stall occurs in decode stage 613 and the pipeline skew parameter of decode stage 613 is equal to 0, which indicates decode stage 614 corresponds with decode stage 623 of load/store pipeline 620, decode stage 623 of load/store pipeline 620 is also stalled. When an imprecise stall occurs in decode stage 613 of variable length integer pipeline 610, expansion two stage 611 and expansion one stage 612 are also stalled. However, none of the pipeline stages of load/store pipeline 620 are required to be stalled.

In most embodiments of the present invention, integer instructions can only stall in decode stage 613. In other embodiments, a precisely stalled integer instruction stalls the corresponding load/store pipeline stage and preceding load/store pipeline stages. Thus, a stall in execute one stage 614 would cause instructions in decode stage 613, expansion two stage 611, and expansion one stage 612 to also stall. Furthermore, a precise stall in execute one stage 614 when the pipeline skew parameter of execute one stage 614 is equal to 2 would also cause all stages of load/store pipeline 620 to stall. A precise stall in execute one stage 614 when the pipeline skew parameter of execute one stage 614 is equal to 1 would cause execute stage 625, execute stage 624, and decode stage 623 of load/store pipeline 620 to stall. A precise stall in execute one stage 614 when the pipeline skew parameter of execute one stage 614 is equal to 0 would cause execute stage 624, and decode stage 623 of load/store pipeline 620 to stall.

A stall in execute two stage 615 would cause instructions in execute one stage 614, decode stage 613, expansion two stage 611, and expansion one stage 612 to also stall. Furthermore, a precise stall in execute two stage 615 when the pipeline skew parameter of execute two stage 615 is equal to 2 or equal to 1 would also cause all stages of load/store pipeline 620 to stall. A precise stall in execute two stage 615 when the pipeline skew parameter of execute two stage 616 is equal to 0 would cause execute stage 625, execute stage 624, and decode stage 623 of load/store pipeline 620 to stall.

A stall in write back stage 616 would cause instructions in execute two stage 615, execute one stage 614, decode stage 613, expansion two stage 611, and expansion one stage 612 to also stall. Furthermore, a precise stall in write back stage 616 would also cause all stages of load/store pipeline 620 to stall regardless of the pipeline skew parameter of write back stage 616.

When a stall occurs in decode stage 623 of load/store pipeline 620 no other pipeline stages are required to be stalled because the instruction in load/store decode stage 623 is the youngest instructions of load/store pipeline 620 and instruction pipeline 610 in the embodiment of FIGS. 6(a) and 6(b).

In general, a stall is imprecise when the stall causes an expansion stage of the variable length integer pipeline to be filled or emptied. However, stalls can also be imprecise even when the expansion stages are not filled or emptied. Furthermore, expansion stages can be emptied without a pipeline stall.

In the embodiment of FIGS. 6(a) and 6(b), the dynamics of the out-of-order execution is limited from a pipeline skew of 0 to 2. In this range, stalls can be imprecise. If all pipeline skew parameters are 0, then the instruction are executed in-order which means the instructions of the load store pipeline are not ahead of the integer pipeline, and vice versa. To prevent negative pipeline skew parameters, a stall in execute one stage 624 of load/store pipeline 620 is considered a precise stall when the pipeline skew parameter of execute one stage 624 or decode stage 623 is equal to zero, while a valid instruction is in the stage. Otherwise stalls in execute one stage 624 are classified as imprecise. As explained above, for a precise stall in execute one stage 624, decode stage 623 is also stalled. Furthermore, when the pipeline skew parameter of execute one stage 624 is equal to 0, decode stage 613, expansion one stage 612, and expansion two stage 611 of variable length integer pipeline 610 are also stalled. When the pipeline skew parameter of execute one stage 624 is equal to 1, expansion one stage 612 and expansion two stage 611 of variable length integer pipeline 610 are also stalled. When the pipeline skew parameter of execute one stage 624 is equal to 2, expansion two stage 611 of variable length integer pipeline 610 is also stalled.

For an imprecise stall in execute one stage 624, decode stage 623 is also stalled but none of the pipeline stages in variable length integer pipeline 610 are required to be stalled due to an imprecise stall in execute one stage 624. If there are no other condition which causes stalls, then variable length integer pipeline 610 continues to execute instructions, which causes the pipeline skews that are greater than zero to be decremented. Thus, pipeline skew parameters are reduced as the expansion stages get emptied, and the instruction execution returns to back in-order execution.

For execute two stage 625 of load/store pipeline 620, a stall is considered a precise stall when the pipeline skew parameters of execute two stage 625, execute one stage 624, or decode stage 623 is equal to zero, while a valid instruction is in the stage. Otherwise stalls in execute two stage 625 are classified as imprecise. For a precise stall in execute two stage 625, execute one stage 624 and decode stage 623 are also stalled. Furthermore, when the pipeline skew parameter of execute two stage 625 is equal to 0, execute one stage 614, decode stage 613, expansion one stage 612, and expansion two stage 611 of variable length integer pipeline 610 are also stalled. When the pipeline skew parameter of execute two stage 625 is equal to 1, decode stage 613, expansion one stage 612, and expansion two stage 611 of variable length integer pipeline 610 are also stalled. When the pipeline skew parameter of execute two stage 625 is equal to 2, expansion one stage 612 and expansion two stage 611 of variable length integer pipeline 610 are also stalled. For an imprecise stall in execute two stage 625, execute one stage 624 and decode stage 623 are also stalled but none of the pipeline stages in variable length integer pipeline 610 are required to be stalled. If there is no other condition which causes stalls, then the variable length integer pipeline 610 continues to execute instructions which leads to decrementing all pipeline skews which are greater than 0. Thus, pipeline skew parameters are reduced, the expansion stages get emptied, and the instruction execution goes back in-order.

In the embodiment of FIGS. 6(a) and 6(b), stalls do not occur in execute two stage 615 or write back stage 616 of variable length integer pipeline 610 because there are no stall sources in these stages and no other situation that causes these stages to stall. Similarly, stalls do not occur in write back stage 626 of load/store pipeline 620. However, in other embodiments of the present invention, stalls in the write-back stage are allowed. For write-back stage 626 of load/store pipeline 620, a stall is considered a precise stall when the pipeline skew parameters of write-back-stage 626, execute two stage 625, execute one stage 624, or decode stage 623 is equal to zero, while a valid instruction is in the stage. Otherwise stalls in write-back stage 626 are classified as imprecise. For a precise stall in write-back stage 626, execute two stage 625, execute one stage 624 and decode stage 623 are also stalled. Furthermore, when the pipeline skew parameter of write-back stage 626 is equal to 0, execute two stage 615, execute one stage 614, decode stage 613, expansion one stage 612, and expansion two stage 611 of variable length integer pipeline 610 are also stalled. When the pipeline skew parameter of write-back stage 626 is equal to 1, execute one stage 614, decode stage 613, expansion one stage 612, and expansion two stage 611 of variable length integer pipeline 610 are also stalled. When the pipeline skew parameter of write-back stage 626 is equal to 2, decode stage 613, expansion one stage 612 and expansion two stage 611 of variable length integer pipeline 610 are also stalled. Thus, in general a precisely stalled load/store instruction stalls the integer pipeline stages that precede the corresponding integer pipeline stage.

For an imprecise stall, execute two stage 625, execute one stage 624 and decode stage 623 are also stalled but none of the pipeline stages in variable length integer pipeline 610 are required to be stalled. If there is no other condition which causes stalls, then the variable length integer pipeline 610 continues to execute instructions which leads to decrementing all pipeline skews which are greater than 0. Thus, the pipeline skew parameters are reduced, the expansion stages get emptied, and the instruction execution goes back to in-order execution.

The pipeline skew parameter can also be used during instruction cancellations. An instruction may need to be cancelled for a variety of reasons. For example, during speculative execution, instructions are placed in the pipelines before actually determining which branch of a conditional should be executed. If the selected branch is incorrect, the instructions must be cancelled. Other causes of instruction cancellation includes error handling, trap handling, and interrupts. When an instruction is cancelled, all younger instructions should also be cancelled.

As explained above, the pipeline skew parameter is used to track the relative position of a load/store instruction and an integer instruction that were simultaneously issued to the load/store pipeline and the variable length integer pipeline, respectively. For clarity, in the embodiments described herein, an integer instruction that is simultaneously issued with load store instruction is precedes the load/store instruction in the instruction sequence of the program.

When an integer instruction in a particular stage (for clarity, the initial instruction to be cancelled is said to be in the initial cancelled stage) is cancelled, all integer instructions in preceding stages are also cancelled. Furthermore, the load/store instructions in the load/store stage that corresponds to the initial cancelled stage and all preceding load/store pipeline stages are cancelled. Therefore, when the initial cancelled stage is expansion two stage 611, the integer instruction in expansion two stage 611 is cancelled. Furthermore, if the pipeline skew parameter of expansion two stage 611 is equal to two, the load/store instruction in decode stage 623 of load store pipeline 620 is also cancelled.

When the initial cancelled stage is expansion one stage 612, the integer instructions in expansion two stage 611 and expansion one stage 612 are cancelled. Furthermore, if the pipeline skew parameter of expansion one stage 612 is equal to one, the load/store instruction in decode stage 623 of load store pipeline 620 is also cancelled. However, if the pipeline skew parameter of expansion one stage 612 is equal to two, the load/store instructions in decode stage 623 and execute one stage 624 of load store pipeline 620 are also cancelled.

When the initial cancelled stage is decode stage 613, the integer instructions in expansion two stage 611, expansion one stage 612, and decode stage 613 are cancelled. Furthermore, if the pipeline skew parameter of decode stage 613 is equal to zero, the load/store instruction in decode stage 623 of load store pipeline 620 is also cancelled. If the pipeline skew parameter of decode stage 613 is equal to one, the load/store instructions in decode stage 623 and execute one stage 624 of load store pipeline 620 are also cancelled. If the pipeline skew parameter of decode stage 613 is equal to two, the load/store instructions in decode stage 623, execute one stage 624, and execute two stage 625 of load store pipeline 620 are also cancelled.

When the initial cancelled stage is execute one stage 614, the integer instructions in expansion two stage 611, expansion one stage 612, decode stage 613, and execute one stage 614 are cancelled. Furthermore, if the pipeline skew parameter of execute one stage 615 is equal to zero, the load/store instructions in decode stage 623 and execute one stage 624 of load store pipeline 620 are also cancelled. If the pipeline skew parameter of execute one stage 614 is equal to one, the load/store instructions in decode stage 623, execute one stage 624, and execute two stage 625 of load store pipeline 620 are also cancelled. If the pipeline skew parameter of execute one stage 614 is equal to two, the load/store instructions in decode stage 623, execute one stage 624, execute two stage 625, and write back stage 626 of load store pipeline 620 are also cancelled. However, in most embodiments of the present invention, instructions in write back stages (e.g., write back stage 616 and write back stage 626) are never cancelled.

Most embodiments of the present invention do not allow cancellation of instructions execute two stage 615. In embodiments that do allow cancellation of instructions in execute two stage 615, when the initial cancelled stage is execute one stage 614, the integer instructions in expansion two stage 611, expansion one stage 612, decode stage 613, execute one stage 614, and execute two stage 615 are cancelled. Furthermore, if the pipeline skew parameter of execute one stage 615 is equal to zero, the load/store instructions in decode stage 623, execute one stage 624, and execute two stage 625 of load store pipeline 620 are also cancelled. If the pipeline skew parameter of execute two stage 615 is equal to one, the load/store instructions in decode stage 623, execute one stage 624, execute two stage 625, and write back stage 626 of load store pipeline 620 are also cancelled. However, in most embodiments of the present invention, instructions in write back stages are never cancelled.

As stated above most embodiments of the present invention do not allow cancellation of instruction in write back stages. For those embodiments that would allow the initial cancelled stage to be write back stage 616, all instructions in both variable length integer pipeline 610 and load/store pipeline 620 are cancelled.

When a load/store instruction in the initial canceled stage is cancelled, all load/store instructions in preceding stages are also cancelled. Furthermore, all integer instructions in stages preceding the integer stage that corresponds with the initial cancelled stage are cancelled. The integer instruction in the integer stage corresponding to the initial cancelled (load/store) stage does not need to be cancelled because as explained above, in the embodiments described herein an integer instruction precedes a simultaneously issued load/store instruction.

When the initial cancelled stage is decode stage 623 of load/store pipeline 620, the load/store instruction in decode stage 623 is cancelled. Furthermore, if the pipeline skew parameter of decode stage 623 is equal to zero, the integer instructions in expansion two stage 611 and expansion one stage 612 of integer pipeline 610 are also cancelled. If the pipeline skew parameter of decode stage 623 is equal to one, the integer instruction in expansion two stage 611 of integer pipeline 610 is also cancelled.

When the initial cancelled stage is execute one stage 624 of load/store pipeline 620, the load/store instruction in decode stage 623 and execute one stage 624 are cancelled. Furthermore, if the pipeline skew parameter of execute one stage 624 is equal to zero, the integer instructions in expansion two stage 611, expansion one stage 612, and decode stage 613 of integer pipeline 610 are also cancelled. If the pipeline skew parameter of execute one stage 624 is equal to one, the integer instructions in expansion two stage 611 and expansion one stage 612 of integer pipeline 610 are also cancelled. If the pipeline skew parameter of execute one stage 624 is equal to two, the integer instruction in expansion two stage 611 of integer pipeline 610 is also cancelled.

When the initial cancelled stage is execute two stage 625 of load/store pipeline 620, the load/store instruction in decode stage 623, execute one stage 624, and execute two stage 625 are cancelled. Furthermore, if the pipeline skew parameter of execute two stage 625 is equal to zero, the integer instructions in expansion two stage 611, expansion one stage 612, decode stage 613, and execute one stage 614 of integer pipeline 610 are also cancelled. If the pipeline skew parameter of execute two stage 625 is equal to one, the integer instructions in expansion two stage 611, expansion one stage 612, and decode stage 613 of integer pipeline 610 are also cancelled. If the pipeline skew parameter of execute two stage 625 is equal to two, the integer instructions in expansion two stage 611 and expansion one stage 612 of integer pipeline 610 are also cancelled.

As stated above most embodiments of the present invention do not allow cancellation of instruction in write back stages. For those embodiments that would allow the initial cancelled stage to be write back stage 626 of load/store pipeline 620, the load/store instruction in decode stage 623, execute one stage 624, execute two stage 625, and write back stage 626 are cancelled. Furthermore, if the pipeline skew parameter of write back stage 626 is equal to zero, the integer instructions in expansion two stage 611, expansion one stage 612, decode stage 613, execute one stage 614, and execute two stage 615 of integer pipeline 610 are also cancelled. If the pipeline skew parameter of write back stage 626 is equal to one, the integer instructions in expansion two stage 611, expansion one stage 612, decode stage 613, and execute one stage 614 of integer pipeline 610 are also cancelled. If the pipeline skew parameter of write back stage 626 is equal to two, the integer instructions in expansion two stage 611, expansion one stage 612, and decode stage 613 of integer pipeline 610 are also cancelled.

Figure 9:
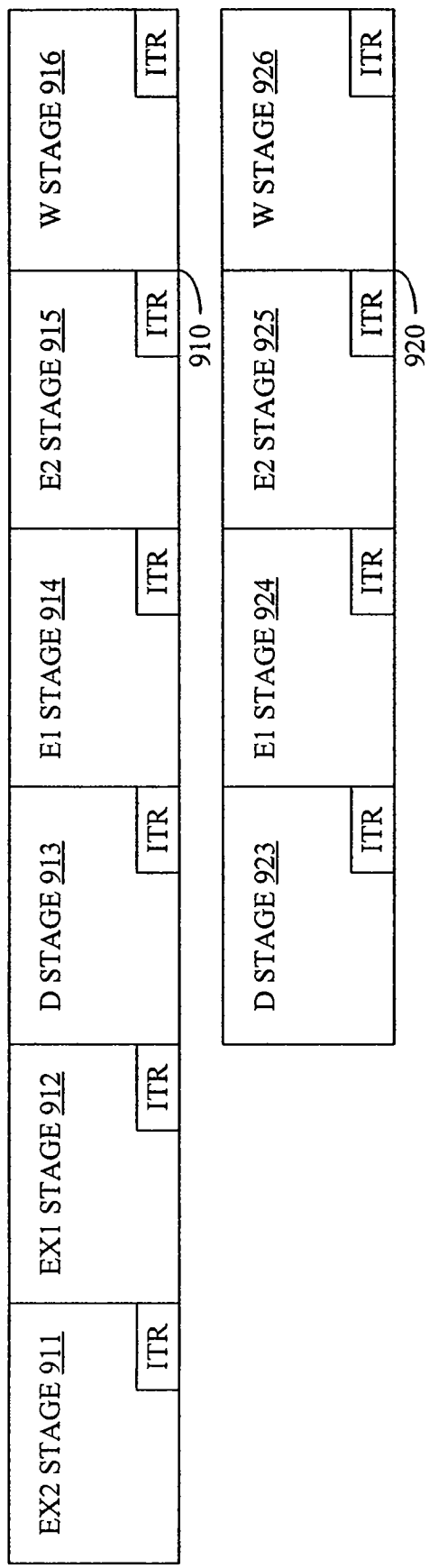
FIG. 9 is a block diagram of an integer pipeline and a load/store pipeline in accordance with an embodiment of the present invention that uses issues tags (ITAGs).

FIG. 9 is a simplified diagram of an embodiment of the present invention that uses issues tags (ITAGS) to quickly calculate pipeline skew parameters. FIG. 9 includes a variable length integer pipeline 910 and a load/store pipeline 920. Variable length integer pipeline 910 includes an expansion two stage 911, an expansion one stage 912, a decode stage 913, execute one stage 914, execute two stage 915, and a write back stage 916. Variable length integer pipeline 910 is very similar to variable integer pipeline 610 (FIG. 6(*a*)), however each pipeline stage of variable length integer pipeline 910 includes an issue tag register (ITR) rather than a pipeline skew register (PSR). Similarly, load/store pipeline 920, which includes a decode stage 923, an execute one stage 924, an execute two stage 925, and a write back stage 926, is very similar to load/store pipeline 620; however, each stage of load/store pipeline 920 includes an issue tag register (ITR) rather than a pipeline skew register (PSR). Issue tags are used to dynamically calculate pipeline skew parameters, thus the pipeline skew parameters need not be stored in each pipeline stage. However, some embodiments of the present invention may include both issue tag registers and pipeline skew registers.

In the embodiment of FIG. 9, every issue group is assigned a unique issue tag with respect to the issue groups still within variable length integer pipeline 910 and load/store pipeline 920. Each instruction in the issue group carries the issue tag through the pipeline in the issue tag register of each pipeline stage. Because there can be at most six issue groups in variable length integer pipeline 910 and load/store pipeline 920, issue tags can be encoded using only three bits. Thus, in one embodiment of the present invention, issue tags are issued sequentially starting with one up to seven and restarting at one again. An issue tag of zero is reserved for issue bubbles as described below.

Issue tags are created based on a few simple rules. First, every integer instruction issued into variable length integer pipeline 910 receives a new issue tag. A load/store instruction issued to load/store pipeline 920 that is dual issued with an integer instruction receives the same issue tag as the integer instruction. An incompressible load/store bubble that is injected into load/store pipeline 920 at the same time as a single issued integer instruction is issued into variable length integer pipeline 910 receives the same issue tag as the integer instruction. Single issued load/store instruction receives the same issue tag that is stored in execute one stage 924 of load/store pipeline 920. Issue stages of variable length integer pipeline 910 that are not issued an integer instruction and do not already contain an integer instruction receive an issue tag of zero. The issue stages of variable length integer pipeline 910 are expansion one stage 911, expansion two stage 912, and decode stage 913. Thus, for example when an instruction is issued to expansion one stage 912, a new issue tag is generated for expansion one stage 912 and the issue tags of expansion two stage 911 is set to the reserved value (i.e. zero) unless a valid integer instruction is in expansion two stage 911. Similarly, the issue tag of decode stage 913 would be set to the reserved value (i.e., zero) unless a valid integer instruction is in decode stage 913.

Stalling of a pipeline stage (i.e. the stalled stage) while the next stage continues causes a bubble in the next stage (i.e. the bubble stage). For example if execute one stage 914 stalls but the instruction in execute two stage 915 continues on to write back stage 916, a bubble in execute two stage 915 is formed. When a bubble forms the bubble stage is assigned the same issue tag as the stalled stage. In the example above, execute two stage 915 would be assigned the same issue tag as execute one stage 914. Cancellation of instructions does not effect the issue tags of the pipeline stages.

Calculation of pipeline skew parameters from issue tags is performed for each pipeline stage using simple comparisons. Specifically, for decode stage 923 of load/store pipeline 920, the pipeline skew parameter is equal to two if the issue tag of decode stage 923 of load/store pipeline 920 is equal to the issue tag of expansion two stage 911 of variable length integer pipeline 910. Alternatively, the pipeline skew parameter of decode stage 923 is equal to one if the issue tag of decode stage 923 of load/store pipeline 920 is equal to the issue tag of expansion one stage 912 of variable length integer pipeline 910. Otherwise the pipeline skew parameter of decode stage 923 of load/store pipeline 920 is equal to zero.

For execute one stage 924 of load/store pipeline 920, the pipeline skew parameter is equal to two if the issue tag of execute one stage 924 of load/store pipeline 920 is equal to the issue tag of expansion one stage 912 of variable length integer pipeline 910. Alternatively, the pipeline skew parameter of execute one stage 924 is equal to one if the issue tag of execute one stage 924 of load/store pipeline 920 is equal to the issue tag of decode stage 913 of variable length integer pipeline 910. Otherwise the pipeline skew parameter of execute one stage 924 of load/store pipeline 920 is equal to zero.

For execute two stage 925 of load/store pipeline 920, the pipeline skew parameter is equal to two if the issue tag of execute two stage 925 of load/store pipeline 920 is equal to the issue tag of decode stage 913 of variable length integer pipeline 910. Alternatively, the pipeline skew parameter of execute two stage 925 is equal to one if the issue tag of execute two stage 925 of load/store pipeline 920 is equal to the issue tag of execute one stage 914 of variable length integer pipeline 910. Otherwise the pipeline skew parameter of execute two stage 925 of load/store pipeline 920 is equal to zero.

The pipeline skew parameter after execute two stage 925 of load/store pipeline 920 does not change. Therefore, the pipeline skew parameter for write back stage 926 of load/store pipeline 920 is copied from execute two stage 925 of load/store pipeline 920 as the instruction from execute two stage 925 of load/store pipeline 920 proceeds to write back stage 926 of load/store pipeline 920.

For expansion two stage 911 of variable length integer pipeline 910, the pipeline skew parameter is equal to two if the issue tag of expansion two stage 911 of variable length integer pipeline 910 is equal to the issue tag of decode stage 923 of load store pipeline 920. Otherwise the pipeline skew parameter of expansion two stage 911 of variable length integer pipeline 910 is equal to zero.

For expansion one stage 912 of variable length integer pipeline 910, the pipeline skew parameter is equal to two if the issue tag of expansion one stage 912 of variable length integer pipeline 910 is equal to the issue tag of execute one stage 924 of load/store pipeline 920. Alternatively, the pipeline skew parameter of expansion one stage 912 is equal to one if the issue tag of expansion one stage 912 of variable length integer pipeline 910 is equal to the issue tag of decode stage 923 of load/store pipeline 920. Otherwise the pipeline skew parameter of expansion one stage 912 of variable length integer pipeline 910 is equal to zero.

For decode stage 913 of variable length integer pipeline 910, the pipeline skew parameter is equal to two if the issue tag of decode stage 913 of variable length integer pipeline 910 is equal to the issue tag of execute two stage 925 of load/store pipeline 920. Alternatively, the pipeline skew parameter of decode stage 913 is equal to one if the issue tag of decode stage 913 of variable length integer pipeline 910 is equal to the issue tag of execute one stage 924 of load/store pipeline 920. Otherwise the pipeline skew parameter of decode stage 913 of variable length integer pipeline 910 is equal to zero.

For execute one stage 914 of variable length integer pipeline 910, the pipeline skew parameter is equal to two if the issue tag of execute one stage 914 of variable length integer pipeline 910 is equal to the issue tag of write back stage 926 of load/store pipeline 920. Alternatively, the pipeline skew parameter of execute one stage 914 is equal to one if the issue tag of execute one stage 914 of variable length integer pipeline 910 is equal to the issue tag of execute two stage 925 of load/store pipeline 920. Otherwise the pipeline skew parameter of execute one stage 914 of variable length integer pipeline 910 is equal to zero.

The pipeline skew parameter after execute one stage 914 of variable length integer pipeline 910 do not change. Therefore, the pipeline skew parameter for execute two stage 915 of variable length integer pipeline 910 is copied from execute one stage 914 of variable length integer pipeline 910 as the instruction from execute one stage 914 proceeds to execute two stage 915. Similarly, write back stage 916 of variable length integer pipeline 910 is copied from execute two stage 915 of variable integer length pipeline 920 as the instruction from execute two stage 915 of variable length integer pipeline 910 proceeds to write back stage 916 of variable length integer pipeline 910.

In the various embodiments of this invention, novel structures and methods have been described to minimize pipeline stalls and data hazards by executing instructions limited out-of-order while allowing precise cancellation of instructions in case of interrupts and other events. Using a variable length integer pipeline having pipeline skew registers with a load/store pipeline also having pipeline skew registers in accordance with an embodiment of the present invention facilitates handling of pipeline stalls, data hazards, data forwarding and instruction cancellation. Furthermore by include issue tags in the pipelines, the pipeline skew parameters can be calculated very efficiently. The various embodiments of the structures and methods of this invention that are described above are illustrative only of the principles of this invention and are not intended to limit the scope of the invention to the particular embodiments described. For example, in view of this disclosure, those skilled in the art can define other instruction fetch stages, pre-decode stages, decode stages, execute stages, expansion stages, write back stages, forwarding paths, instruction pipelines, load/store pipelines, integer pipelines, instructions, issue tags, pipeline skew parameters, and so forth, and use these alternative features to create a method or system according to the principles of this invention. Thus, the invention is limited only by the following claims.

What is claimed is:

1. A method of operating a processor having a first-type pipeline and a second-type pipeline, wherein the first-type pipeline includes a plurality of first-type pipeline stages and the second-type pipeline includes a plurality of second-type pipeline stages, the method comprising:

simultaneously issuing a first first-type instruction into a first first-type pipeline stage and a first second-type instruction into a first second-type pipeline stage;

generating a first first-type issue tag for the first first-type instruction, wherein the first first-type issue tag is unique relative to other first-type issue tags in the first-type pipeline;

generating a first second-type issue tag for the first second-type instruction, wherein the first second-type issue tag is unique relative to other second-type issue tags in the second-type pipeline; and comparing the first first-type issue tag with the first second-type issue tag to calculate a pipeline skew parameter.

2. The method of claim 1, wherein the first first-type issue tag equals the first second-type issue tag.

3. The method of claim 1, further comprising:

storing the first first-type issue tag in the first first-type pipeline stage; and storing the first second-type issue tag in the first second-type pipeline stage.

4. The method of claim 3 further comprising:

propagating the first first-type issue tag through the first-type pipeline with the first first-type instruction; and propagating the first second-type issue tag through the second-type pipeline with the first second-type instruction.

5. The method of claim 1, further comprising:

issuing a second second-type instruction into a second-type decode stage;

generating a second second-type instruction tag equal to a previous second-type issue tag stored in a second-type execute one stage, wherein the second-type execute one stage follows the second-type decode stage in the second-type pipeline; and storing the second second-type instruction tag with the second second-type instruction in the second-type decode stage.

6. The method of claim 1, further comprising storing a reserved value as a first-type issue tag of a first expansion stage when the first expansion stage does not contain a valid first-type instruction.

7. The method of claim 6, further comprising storing the reserved value as a first-type issue tag of a second expansion stage when the second expansion stage does not contain a valid first-type instruction.

8. The method of claim 1, further comprising copying a second first-type issue tag of a stalled first-type pipeline stage into a bubble stage following the stalled first-type pipeline stage.

9. The method of claim 1, further comprising copying a second second-type issue tag of a stalled second-type pipeline stage into a bubble stage following the stalled second-type pipeline stage.

10. The method of claim 1, wherein the first-type pipeline is an integer pipeline and the second-type pipeline is a load/store pipeline.

11. The method of claim 1, wherein the first-type pipeline is a first integer pipeline and the second-type pipeline is a second integer pipeline.

12. The method of claim 1, wherein the first-type pipeline is a first load/store pipeline and the second-type pipeline is a second load/store pipeline.

13. A processor comprising:
a first-type pipeline having a plurality of first-type pipeline stages;
a second-type pipeline having a plurality of second-type pipeline stages;
means for simultaneously issuing a first first-type instruction into a first first-type pipeline stage and a first second-type instruction into a first second-type pipeline stage;
means for generating a first first-type issue tag for the first first-type instruction, wherein the first first-type issue tag is unique relative to other first-type issue tags in the first-type pipeline;
means for generating a first second-type issue tag for the first second-type instruction, wherein the first second-type issue tag is unique relative to other second-type issue tags in the second-type pipeline; and
means for comparing the first first-type issue tag with the first second-type issue tag to calculate a pipeline skew parameter.

14. The processor of claim 13, wherein the first first-type issue tag equals the first second-type issue tag.

15. The processor of claim 13, further comprising:
means for storing the first first-type issue tag in the first first-type pipeline stage; and
means for storing the first second-type issue tag in the first second-type pipeline stage.

16. The processor of claim 15 further comprising:
means for propagating the first first-type issue tag through the first-type pipeline with the first first-type instruction; and
means for propagating the first second-type issue tag through the second-type pipeline with the first second-type instruction.

17. The processor of claim 13, further comprising:
means for issuing a second second-type instruction into a second-type decode stage;
means for generating a second second-type instruction tag equal to a previous second-type issue tag stored in a second-type execute one stage, wherein the second-type execute one stage follows the second-type decode stage in the second-type pipeline; and
means for storing the second second-type instruction tag with the second second-type instruction in the second-type decode stage.

18. The processor of claim 13, further comprising means for storing a reserved value as a first-type issue tag of a first expansion stage when the first expansion stage does not contain a valid first-type instruction.

19. The processor of claim 18, further comprising means, for storing the reserved value as a first-type issue tag of a second expansion stage when the second expansion stage does not contain a valid first-type instruction.

20. The processor of claim 13, further comprising means for copying a second first-type issue tag of a stalled first-type pipeline stage into a bubble stage following the stalled first-type pipeline stage.

21. The processor of claim 13, further comprising means for copying a second second-type issue tag of a stalled second-type pipeline stage into a bubble stage following the stalled second-type pipeline stage.

22. The processor of claim 13, wherein the first-type pipeline is an integer pipeline and the second-type pipeline is a load/store pipeline.

23. The processor of claim 13, wherein the first-type pipeline is a first integer pipeline and the second-type pipeline is a second integer pipeline.

24. The processor of claim 13, wherein the first-type pipeline is a first load/store pipeline and the second-type pipeline is a second load/store pipeline.

25. A processor comprising:
a variable length first-type pipeline having a first plurality of pipeline stages, wherein each pipeline stage in the first plurality of stages includes an issue tag register; and
a second-type pipeline having a second plurality of pipeline stages, wherein each pipeline stage in the second plurality of stages includes an issue tag register,
wherein each issue tag register stores an issue tag and the processor is configured to compare the issue tags to calculate a plurality of pipeline skew parameters.

26. The processor of claim 25, wherein each issue tag register stores an issue tag assigned to an issue group of instructions.

27. The processor of claim 25, wherein pipeline skew parameters track the relative position of a second-type instruction and a first-type instruction that were simultaneously issued to the second-type pipeline and the variable length first-type pipeline, respectively.

28. The processor of claim 25, wherein the variable length first-type pipeline comprises:
a first pipeline stage;
a first expansion stage coupled to the first pipeline stage; and
a second pipeline stage coupled to the first pipeline stage and the first expansion stage, wherein the second pipeline stage is configured to selectively receive instructions from the first pipeline stage or the first expansion stage.

29. A processor comprising:
a first-type pipeline having a plurality of first-type pipeline stages;
a second-type pipeline having a plurality of second-type pipeline stages;
an issuer configured to issue a first first-type instruction into a first first-type pipeline stage and a first second-type instruction into a first second-type pipeline stage;
a first generator configured to generate a first first-type issue tag for the first first-type instruction, wherein the first first-type issue tag is unique relative to other first-type issue tags in the first-type pipeline; and a second generator configured to generate a first second-type issue tag for the first second-type instruction, wherein the first second-type issue tag is unique relative to other second-type issue tags in the second-type pipeline;

wherein the processor is configured to compare the first first-type issue tag with the first second-type issue tag to calculate a pipeline skew parameter.

* * * * *

UNITED STATES PATENT AND TRADEMARK OFFICE
CERTIFICATE OF CORRECTION

| | | |
|---|---|---|
| PATENT NO. | : 7,454,598 B2 | Page 1 of 1 |
| APPLICATION NO. | : 11/130555 | |
| DATED | : November 18, 2008 | |
| INVENTOR(S) | : Neil S. Hastie | |

It is certified that error appears in the above-identified patent and that said Letters Patent is hereby corrected as shown below:

On the Title page, in the title (54), delete "CONTROLLING OUT OF ORDER EXECUTION PIPELINES ISSUE TAGGING" and insert -- CONTROLLING EXECUTION PIPELINES USING ISSUE TAGGING --, therefor;

Col. 1, line 2, delete "CONTROLLING OUT OF ORDER EXECUTION PIPELINES ISSUE TAGGING" and insert -- CONTROLLING EXECUTION PIPELINES USING ISSUE TAGGING --, therefor;

Col. 6, line 67, delete "value into a register file" and insert -- location --, therefor;

Col. 7, line 1, after "back" insert -- stage --;

Col. 8, line 6, after "stage" insert -- 615 of variable length integer pipeline 610 corresponds with execute one stage 624, execute 2 stage --;

Col. 9, line 48, after "610" insert -- . --; and

Col. 9, line 60, delete "in-write" and insert -- in write --, therefor.

Signed and Sealed this

Twenty-fourth Day of February, 2009

JOHN DOLL
*Acting Director of the United States Patent and Trademark Office*